United States Patent
Kawahito et al.

(10) Patent No.: US 6,665,864 B1
(45) Date of Patent: Dec. 16, 2003

(54) METHOD AND APPARATUS FOR GENERATING CODE FOR ARRAY RANGE CHECK AND METHOD AND APPARATUS FOR VERSIONING

(75) Inventors: Motohiro Kawahito, Sagamihara (JP); Hideaki Komatsu, Yokohama (JP); Toshiaki Yasue, Sagamihara (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/473,858

(22) Filed: Dec. 28, 1999

(30) Foreign Application Priority Data

Jan. 5, 1999 (JP) .............................. 11-000712

(51) Int. Cl.$^7$ .............................. G06F 9/45; G06F 9/44
(52) U.S. Cl. ........................ 717/151; 717/122; 717/152; 717/160
(58) Field of Search ................................ 717/122, 127, 717/131, 140, 141, 148, 150, 151, 160

(56) References Cited

U.S. PATENT DOCUMENTS

| | | | | |
|---|---|---|---|---|
| 5,537,620 A | * | 7/1996 | Breternitz et al. | 717/160 |
| 5,797,013 A | * | 8/1998 | Mahadevan et al. | 717/160 |
| 6,202,204 B1 | * | 3/2001 | Wu et al. | 717/151 |
| 6,343,375 B1 | * | 1/2002 | Gupta et al. | 717/152 |
| 6,363,521 B1 | * | 3/2002 | Yasue et al. | 717/128 |

OTHER PUBLICATIONS

Gupta, A fresh look at optimizing aray bound check, ACM SIGPLAN PLDI, pp 272–282, 1990.*
Kolte et al, "Elimination of redundant array subscript range checks", ACM SIGPLAN , pp 270–278, 1995.*
Xi et al "Eliminating array bound checking through dependent types", ACM SIGPLAN, pp 249–257, 1998.*
Deitz et al Elimainting redundancies in sum of product array computations, ACM ICS, pp 65–77, 2001.*
Granston et al, "Detecting redundant accesses to array data", ACM pp 854–865, 1991.*
Gupta, Rajiv, (1990), "Optimizing Array Bound Checks Using Flow Analysis", ACM SIGPLAN'90 Conference on Programming Language Design and Implementation.

* cited by examiner

*Primary Examiner*—Hoang-Vu Antony Nguyen-Ba
(74) *Attorney, Agent, or Firm*—Scully, Scott, Murphy & Presser; Richard M. Ludwin

(57) ABSTRACT

The present invention eliminates redundant array range checks. A two-phased check is performed, namely a wide range check is performed by combining a plurality of array range checks, and a strict range check is unsuccessful, so as to reduce the number of range checks at execution time and allow execution at high speed. For instance, it is possible with a processor such as PowerPC, by using a flag, to invalidate a code for performing an array range check at high speed without increasing a code size. Consequently, the number of array range checks to be executed can be reduced so as to allow execution at high speed. Also, for instance, a plurality of array range checks can be combined without considering existence of instructions which cause a side effect. Consequently, the number of array range checks to be executed can be reduced so as to allow execution at high speed. In addition, a versioning is performed by using, as array access information for versioning, information of array access information for versioning information of array accesses which are always performed even if passing through any execution path in a loop so that there are fewer cases where it goes to a version with a larger number of array range checks at execution time.

18 Claims, 10 Drawing Sheets

METHOD AND APPARATUS FOR GENERATING CODE FOR ARRAY RANGE CHECK AND METHOD AND APPARATUS FOR VERSIONING

BACKGROUND OF INVENTION

1. Technical Field

This invention relates to a compiler, particularly to a method for reducing the number of array range checks in a compiler to increase execution speed of a program. An array range check is a check on whether an array access in a program is exceeding a range of the array.

2. Prior Art

There is a method for eliminating array range checks by using data-flow analysis (see "Optimizing array bound checks using flow analysis", R. Gupta, ACM Letters on Programming Languages and Systems, 2(1–4), pp. 135 to 150, March–December, 1993, etc.). This method eliminates an array range check by the following two-phased process. Namely, (1) Insert a check near the beginning in program execution order so as to decrease array range checks. (2) Eliminate redundant array range checks. The advantage of this method is that it can apply to other places than a loop. However, it has its disadvantages, namely, the range in which it can eliminate array range checks is narrow and it can only apply to a language whose specification defines that it is a error to exceed a range.

As to other background arts, there is a method of loop conversion by loop splitting. This is a method of dividing a loop into three portions: a checked portion, an unchecked portion of the lower bound value and a checked portion of the upper bound value. For instance, a program of Table 1 is converted to of Table 2.

TABLE 1

```
for (i = start; i <= end; i++)
    a[i] = 0;
```

TABLE 2

```
for (i = start; i <= min(max(start, 0)-1, end); i++)
    a[i] = 0;
for (i = max(start, 0); (i <=min(end, N-1); i++)
    a[i] = 0;       /* no check required */
for (i = max(start, min(end, N-1)+1); i<=end; i++)
    a[i] = 0;
```

If divided into three portions in this way, the second for loop can omit a range check. As a disadvantage of this method, if an array access in a loop is simple, the code size merely becomes three times larger, while, as to a case where there are a plurality of array base variables, there are more portions to be divided into and the code size becomes accordingly larger.

The Java language (Java is a trademark of Sun Microsystems, Inc.) is, as its specification, capable of detecting an access exceeding an array range, and when there is no user-defined exception handler, moving control to an invoked method after getting out of a method in which an exception occurred, or when there is a user-defined exception handler, moving the process to the exception handler. Accordingly, an array range check is essential since occurrence of an exception may be described as a correct operation in a program. However, an array range check slows execution speed compared with a language which does not require such a check. In an actual program, there is an array access to ensure that there is no access exceeding a range, and thus elimination of such redundant array range checks greatly contributes to improved performance. In addition, it is more desirable if the range of optimization can be expanded from the viewpoint of ensuring execution order between occurrence of an exception and a process with a side effect such as an assignment of a value to an array.

An object of the present invention is to reduce the number of array range checks and increase execution speed.

Another object of the present invention is to perform a two-phased check, namely to perform a wide range check by combining a plurality of array range checks, and perform a strict range check in the case that the wide range check fails, so as to provide a method for reducing the number of array range checks at execution time and allowing execution at increased speed.

A further object of the present invention is to provide a method for versioning by using information about array accesses which are always performed even if passing through any execution path in a loop. Versioning is a process which, at compilation time, (1) classifies execution states of a code of a certain portion of a program into several states, and (2) generates at execution time a check code to classify such states and an execution code of the certain portion of the program for each state.

SUMMARY OF THE INVENTION

The present invention to reduce the number of array range checks is, in a wider, to combine a plurality of array range checks and generate a code for a combined array range checks, and to generate a code for an array range check included in the plurality of array range checks in the case that the combined array range check is unsuccessful. These codes are stored in a storage and executed later by a processor. To make such a concept more specific, it becomes the following three forms.

In the first form, in the case of generating a code for an array range check for an array access in a program, it is executed, comprises: a first step of generating and storing in a storage (for instance, main memory) a first code for storing in one or a plurality of storage areas (for instance, flags of a processor) a result of combined array range check which combines a plurality of array range checks corresponding to a plurality of array accesses (for instance, VERSION_OR [B] in the Embodiments); and a second step of generating and storing in a storage a third code (for instance, a zero-cycle branch instruction in Power PC (a trademark of International Business Machines Corp.)) for checking the storage area and for invalidating a second code (an array range check which must be executed so as not to be incorrectly executed, unless invalidated by the third code) for an array range check included in the plurality of array range checks if the storage area indicates the combined array range check is successful. For instance, when using a processor whose flag can be used as a register, the second code can be invalidated at high speed and the number of array range checks can be reduced without increasing a code size so much. Using a flag as a register means that the flag can be kept without having its content arbitrarily destroyed by an arithmetical instruction, etc.

The aforementioned first step may comprise the steps of: combining array range checks for a plurality of array accesses according to a predetermined condition and storing in a storage information about a combined array range check; and allocating the combined array range check to a storage area.

In the case of versioning in the first form of the present invention, there is the further executed step of:

generating and storing in a storage a code which refers to the storage area storing the result of the combined array range check which is a condition of the versioning, if the storage area indicates that the combined array range check is successful, branches into versions not including a code for array range check included in the combined array range check, and if the storage area indicates that the combined array range check is unsuccessful, branches into versions including the second and third codes. This allows faster execution than ever even in the case that the combined array range check which is a condition of the versioning is unsuccessful.

In the second form of the present invention, in the case of generating a code for an array range check for an array access in a program, there are the performed steps of: generating and storing in a storage a second portion (for instance, part B of the Embodiments) for performing an array range check for necessary range corresponding to the array access included, the second portion corresponding to a first portion to be processed (for instance, part A of the Embodiments) of the program; performing for the first portion, an optimization process for array range checks and an elimination process for redundant array range checks regardless of the existence of a side effect instruction so that a side effect is caused by moving an array range check issuing an exception before the side effect instruction, and storing in a storage for each basic block in the first portion information about necessary array range checks (or unremovable array range checks); and generating and storing in a storage a conditional branch code for performing the necessary array range check and for jumping to a basic block in the second portion if the array range check is not successful, the basic block corresponding to a basic block which includes the unsuccessful array range check. The second form of the present invention can be performed even if the first form cannot be performed. Also, since the first portion after an optimization and an elimination for redundant array range checks is executed until there is an array access for which an array range check is essentially unsuccessful, the number of array range checks can be reduced.

In the third form of the present invention, in the case of versioning a loop in a program, there are the executed steps of: collecting first set information (VERSION_AND[B] in the Embodiments) of array range checks for array accesses which are always performed even if passing through any execution path in a loop, and storing in a storage a collection result; by using the collection result, generating and storing in a storage a check code for the versioning; eliminating a redundant array range check by using the collection result, and generating and storing in a storage a version in the case that an array range check by the check code is successful, the version including a code for unremovable array range check; and generating and storing in a storage a version in the case that an array range check by the check code is unsuccessful. Thus, only in the case that an array range check is always unsuccessful in a loop, a version in the case that an array range check by the check code is unsuccessful is executed so that reduction in the number of array range checks can be expected.

While the above was a case of two versions, it is also possible to divide into three versions and the following steps are executed in this case. Namely, the steps of: collecting second set information (VERSION_OR[B] in the Embodiments) of array range checks not restrictively for array range checks for array accesses which are always performed even if passing through any execution path in the loop, and storing in a storage a second collection result; generating and storing in a storage a second check code for further versioning a version in the case that an array range check by the check code is successful by using third set information, the information being the second set information after removing array range checks included in the first set information; and eliminating a redundant array range check by using the second collection result, and generating and storing in a storage a version in the case that an array range check by the second check code is successful, the version including a code for unremovable array range checks. Meanwhile, the version in the case that an array range check by the check code is successful is the version in the case that an array range check by the second check code is unsuccessful. By doing so, the code size becomes three times larger, while, if the original code is little, further reduction in the number of array range checks at execution time can be expected.

It is also possible to combine the first and third forms of the present invention, and for instance, there can be the further executed steps of: in the case of two versions, generating and storing in a storage a code for storing in a flag of a processor which executes the generated code a result of an array range check, the check based on the unremovable array range check and a range of an index variable; and checking the flag, and if the flag indicates success of the unremovable array range check, generating and storing in a storage another code for invalidating the code for unremovable array range check. This can speed up processing since, in the case that an array range check by the check code is successful, only a flag may be checked omitting an actual array range check.

If a flag of a processor is used to obtain an effect similar to the above, it is thinkable to execute steps of: collecting second set information (VERSION_OR[B] in the Embodiments) of array range checks not restrictively for array range checks for array accesses which are always performed even if passing through any execution path in the loop, and storing in a storage a second collection result; generating and storing in a storage a code for storing in a flag of a processor which executes the generated code a result of third set information (VERSION_OR[B]–VERSION_AND[B] in the Embodiments), the information being the second set information after removing array range checks included in the first set information; and checking the flag, and if the flag indicates success of an array range check included in the third set information, generating and storing in a storage another code for invalidating the code for unremovable array range check in the case of two versions.

Also, to combine the first and third forms of the present invention in the case of no versioning, in the first step described in the process for the first form of the present invention, there are the executed steps of: collecting first set information (VERSION_AND[B] in the Embodiments) of array range checks for array accesses which are always performed even if passing through any execution path in a certain portion of the program, and storing in a storage a collection result; collecting second set information (VERSION_OR[B] in the Embodiments) of array range checks not restrictively for array range checks for array accesses which are always performed even if passing through any execution path in the certain portion, and storing in a storage a second collection result; and allocating array range checks included in the second set information to one storage area and allocating array range checks in third set information to one or a plurality of storage areas, the third information being the second information after removing array range checks included in the first set information. This can effectively eliminate array range checks.

As above, the present invention has been represented as a flow of processing, while it is also possible to implement it by a computer or a computer program, or a dedicated circuit or device which execute the above process. Moreover, in the case of implementing it by a computer program, the computer program may be stored on a storage medium such as a CD-Rom, a floppy disk or a hard disk.

BRIEF DESCRIPTION OF THE DRAWINGS

Preferred embodiments of the present invention will now be described, by way of example only, with reference to the accompanying drawings in which.

DETAILED DESCRIPTION OF THE PREFERRED EMBODIMENTS OF THE INVENTION

Figure 1:
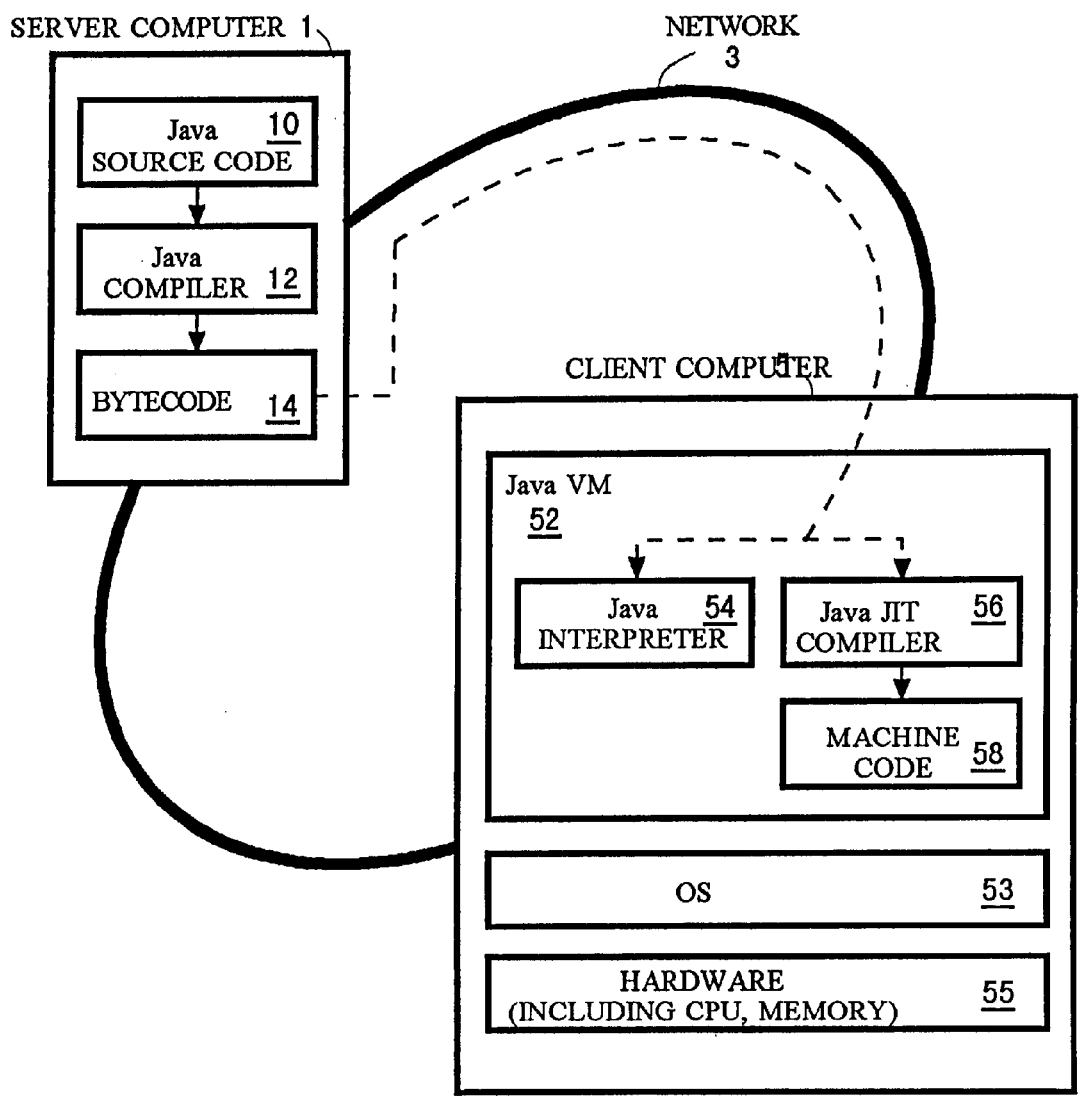
FIG. 1 is an overview of the entire system of the present invention.

The device configuration of the present invention in an environment using Java is described by using FIG. 1. Server computer 1 and client computer 5 are connected via network 3. Client computer 5 includes Java VM (Virtual Machine) 52 and OS (Operating System) 53 and hardware (including a CPU and memory) 55. In addition, Java VM 52 includes Java interpreter 54 or Java JIT compiler 56. It may have both interpreter 54 and JIT compiler 56. Moreover, client computer 5 may be, other than an ordinary computer, a so-called network computer or a home information appliance which has smaller size of memory or does not include any auxiliary storage such as a hard disk.

On server computer 1, Java source code 10 is compiled by Java compiler 12. The result of this compilation is bytecode 14. This bytecode 14 is sent to client computer 5 via network 3. Bytecode 14 is a native code for Java Virtual Machine (Java VM) 52 installed on a WWW browser (World Wide Web Browser) in client computer 5, etc., and Java interpreter 54 or Java JIT compiler 56 is used when actually executed on the CPU of hardware 55. Interpreter 54 decodes bytecode 14 at execution, and invokes and executes a processing routine prepared for each instruction. On the other hand, JIT compiler 56 converts a bytecode to machine code 58 by using a compiler in advance or immediately before execution and then executes it on the CPU.

The processing of JIT compiler 56 related to the present invention is described below.

(A) A process, on a processor which can use a flag as a register, for allocating to a flag of the processor a result of a wide range check, and invalidating a code for an array range check using the flag As mentioned earlier, using a flag as a register means that contents of a flag can be kept in the flag without having been arbitrarily destroyed by an arithmetical instruction, etc. It is intended, for instance, to utilize Predicate execution of Merced (a development code name of Intel's next-generation processor) or Zero Cycle Branch of Power PC. However, these are merely examples, and other processors having the same features are effective to this invention.

Figure 2:
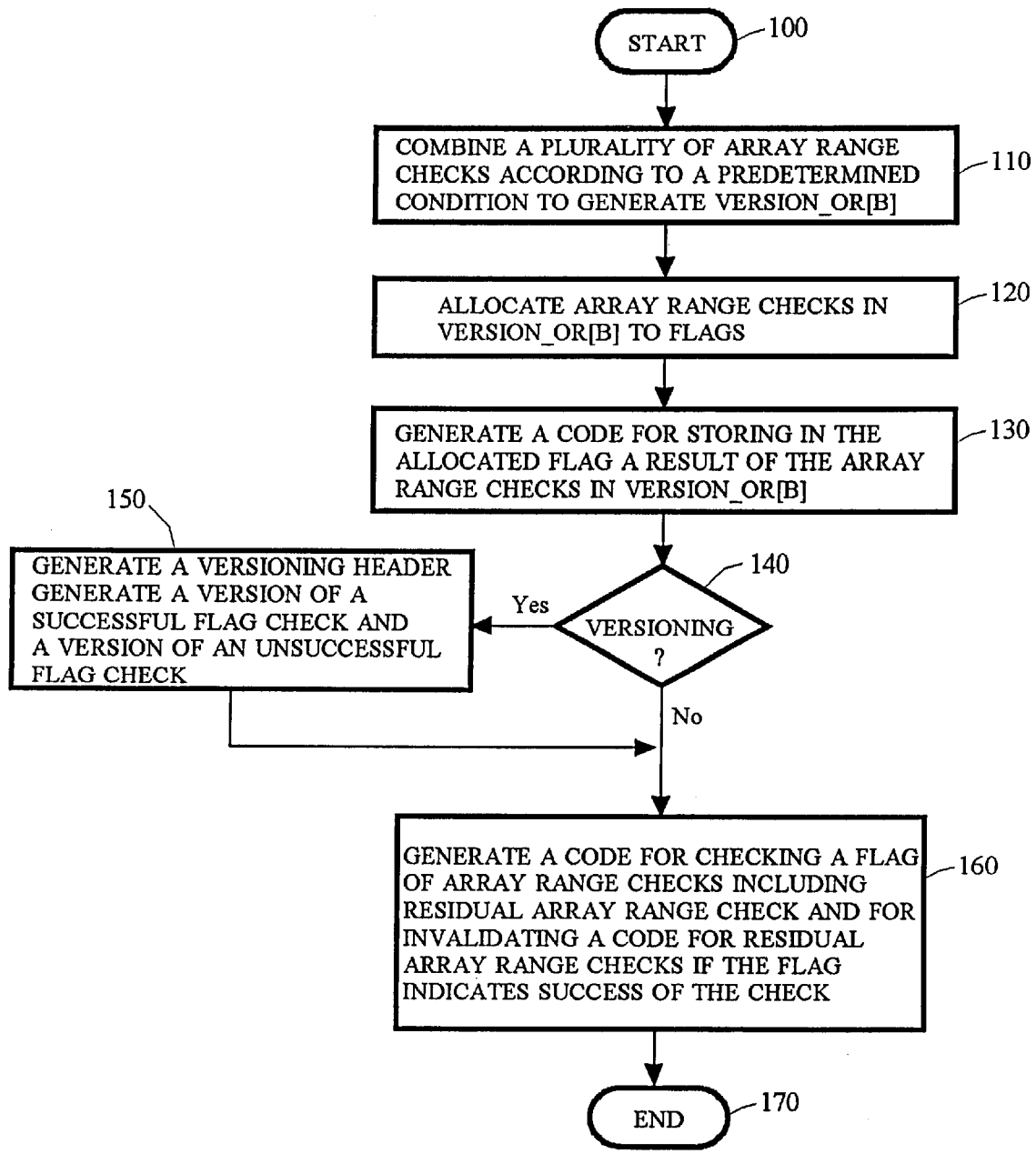
FIG. 2 is a flowchart showing a processing of the first form (process (A)) of the present invention.

Now, an outline of this process is described by using FIG. 2. First, a plurality of array range checks corresponding to a plurality of array accesses are combined according to a predetermined condition, and consequently VERSION_OR[B] is stored in a storage (main memory, for instance) (step 110). This process for combination is discussed in detail later. Though it is not shown in FIG. 2, an optimization process for array range checks may be performed after this step 110. And an array range check of VERSION_OR[B] is allocated to a single flag or a plurality of flags (step 120). A process necessary for this allocation is also discussed in detail later. Next, a code for storing in an allocated flag a result of a combined array range check is generated and stored in a storage (step 130). In the case that a versioning is performed (step 140), versioning headers are generated by using a flag, a version of a successful flag check and a version of an unsuccessful flag check are generated and stored in a storage (step 150). A version of a successful flag check and a version of an unsuccessful flag check are substantially the same so far. In the case that no versioning is performed (step 140), or in the case that, after step 150, for the entire method, redundant array range checks are eliminated as detailed later and a flag corresponding to an array range check including a residual array range check remaining after the elimination process is checked, and if the flag indicates success of the check, a code for invalidating a code for any residual array range check is generated and stored in a storage (step 160). If an optimization process is performed after step 110, there will be smaller number of array range checks to be eliminated due to elimination of redundant array range checks in step 160.

Now, each step is descried in detail. First, generation of VERSION_OR[B] in step 110 is described. In this process (1) in step 110, while in principle handling the array range checks related to an instruction for modifying an array index or an array base as unrelated to this step, C_GEN[B] which is a set of array range checks at the beginning of a basic block is collected in reverse order of the program execution. However, in the case that an array index variable is modified to v=v+c (c is a positive or negative constant), not regarding it as unrelated to this step, an array index expression f(v) in set information C_GEN[B] is recalculated as f(v+c) and is replaced. The following shows a pseudocode of the process (1) in step 110.

TABLE 3

```
for (for each basic block, an instruction is fetched in reverse order of
the program execution) {
switched (instruction) {
    array access instruction:
        for the array range check C
C_GEN[B] += C;
break;
instruction to modify array base variable a:
    for (all C ∈ C _GEN[B]) {
        if (1b (a) or UB (a) by modified array base a are
            included in C) {
            C_GEN[B] -= C;
        }
    }
    break;
instruction to modify index variable v:
    for (all C ∈ C_GEN[B]) {
        if (C comprises modified index variable v
            or expression f(v) of v) {
            if (index variable v is modified by v = v+c
                (c is a positive or negative constant : addition
                or subtraction of a constant)) {
                v of C is replaced by v+c, or f(v) by f(v+c)
            } else {
                C_GEN[B] -=C;
            }
        }
    }
    break;
    }
}
```

The entire Table 3 is performed for each basic block. And for each instruction in each basic block, processing in a for loop is performed. Instructions are fetched in reverse order of the program execution. A switched sentence executes a process specified under an applicable condition if fetched instruction comes under any of the conditions below it (three conditions here). These conditions are in array access instruction, an instruction to modify array base variable a, and an instruction to modify index variable v. In the case of an array access instruction, array range check C for the array access instruction is put in C-GEN[B]. In the case of an instruction to modify array base variable a, since this invention cannot handle array range check C related to this base variable a, a process of eliminating C from C_GEN[B] is executed. In the case of an instruction to modify index variable v, it is checked whether or not each array range check C in C_GEN[B] is related to the modified array index variable v. In the case of a check by a constant and upper or lower bound of an array index, modification operation of index variable v does not affect the check. And it is determined whether the instruction to modify index variable v is an additive or subtractive instruction. If the instruction to modify index variable v is an additive or subtractive instruction, array range check C in C_GEN[B] also adds or subtracts a constant pursuant to either addition or subtraction of the constant. In the case that modification of index variable v which cannot be handled by this invention is performed, the array range check C related to the index variable b is eliminated from C_GEN[B].

The process (2) in step 110 is detailed next. By using C_GEN[B] collected above, here, the following expression is executed once for every basic block in order of a post-order traversal of a depth-first search (DFS), namely in order that the following basic blocks come first.

For every S that meets the conditions of being S ∈ Succ(B) and both B and S being either in the same loop or out of loop, C_OUT_OR[B]=∪C_IN_OR[S]
C_IN_OR[B]=C_GEN[B]∪backward(C_OUT_OR[B], B)

Succ(B) means every basic block immediately following B.

The above expression indicates the following. An array range check set C_OUT_OR[B] at the end of a certain basic block B is a sum set of array range check set C_IN_OR[S] which is at the beginning of all the basic blocks S meeting the conditions of being S c Succ(B) and basic blocks B and basic blocks S being either in the same loop or both out of loop. In addition, C_OUT_OR[B] newly becomes a set, backward(C_OUT_OR[B], B) after being modified as predetermined according to modification to an array index performed in basic block B by a process mentioned later. A sum set of this set backward(C_OUT_OR[B], B) and the earlier acquired C_GEN[B] is C_IN_OR[B]. What is ultimately necessary is this C_IN_OR[B].

Processing of backward(C_OUT_OR[B], B) is described in Appendix A.

In process (3) in step 110, data-flow analysis with the following expression is performed by using C_IN_OR[B] created in process. (2) so as to create FLAG_IN[B] and FLAG_OUT[B].

As to every P which is P∈Pred(B),

FLAG_IN[B]=∩FLAG_OUT[P]
FLAG_OUT[B]=C_IN_OR[B]∪forward(FLAG_IN[B], B)

Pred(B) means every basic block which is immediately before B.

The above expression means the following. A product set of set FLAG_OUT[P] at the end of every basic block P which is immediately before basic block B is set FLAG_IN[B]. And this set FLAG_IN[B] is processed by forward (FLAG_IN[B], B), then a sum set of its results and set C_IN_OR[B] acquired in process (2) is sum set FLAG_OUT[B].

Processing of forward(FLAG_IN[B], B) is described in Appendix B.

In process (4) in step 110, the following expression is performed for every basic block so as to eliminate redundant array set information in C_IN_OR[B].

C_IN_OR[B]=C_IN OR[B]–FLAG_IN[B]

In process (5) in step 110, by using C_IN_OR[B] created in process 4), based on an invariant array access in the portion of the program to be processed by A (loop for instance), and in the case of a loop, based on a range a loop variable can take as to an array access for which such a range can be identified, array range check set information VERSION_OR[B] at the entry point of the portion of the program to be processed (a loop for instance) is calculated. This VERSION_OR[B] is information of array range checks in a versioning header. For instance, if the loop variable is i and the range it can take is found to be from 1 to less than n, VERSION_OR[B] is created by checking ub(a) in the case of i=n−1, and 1b(a) as i=1. This VERSION_OR[B] is information of a combined array range check in A.

Next, an optimization of an array range check not shown in FIG. 2 is described in Appendix C. Though A is effective without implementing this process, this process is performed so as to further reduce the number of array range checks. This optimization of an array range check is performed before versioning. It can also be performed before step 110.

The process in step 120 is described next. A process of allocating VERSION_OR[B] acquired in step 110 to flags is performed. Namely, a pseudocode is processed as follows.

As to the portion of the program to be processed by A (a loop for instance), it is as follows.

Moreover, initially it is as follows:

The number of array range checks in VERSION_OR[B]: n The maximum number of allocable flags of a processor: fn

TABLE 4

```
if (n <= 1 || fn <= 1) {
    <Allocation to flags and invalidation of a code for an array range
    check are not performed.>
} else {
    if (n > fn) {
        <Array range checks in VERSION_OR[B] are sorted by the
        number of corresponding array range checks in the portion
        to be processed.>
        do {
            <Two items in order of decreasing number of array
            range checks are erased and the two items and the
            number of array range checks are merged into one
            item so as to be inserted in the sorted array
            range check set information.>
            n --;
        } while (n > fn);
    }
    <Allocate to each flag an AND for array range checks and
    range checks of loop variables, etc. In the case that a
    plurality of array range checks are merged, their ANDS are
    allocated.>
    C_IN_OR[B] -= an array range check used as a versioning header:
    fn -= n;
}
```

Table 4 is briefly described. As to the first if sentence, in the case that the number of array range checks included in VERSION_OR[B] is 0 or the number of available flags is 0, processing ends here since the process of Table 4 does not make sense. If this condition is met, it is checked whether n>fn. In other words, it is checked whether the number of array range checks is larger than the number of flags. If the number of flags is larger than the number of array range checks in VERSION_OR[B], each array range check and in the case of a loop, a meet with a range check of a loop variable (AND) is allocated to each flag. On the other hand, if the number of flags is smaller than the number of array range checks in VERSION_OR[B], several array range checks in VERSION_OR[B] must be collectively allocated to one flag. Thus, the array range checks in VERSION_OR [B] are sorted by the number of corresponding array range checks in the portion to be processed (a loop for instance). And the following process is repeated until the number of items in the array range check set information which were merged and created becomes smaller than the number of flags. This process is to erase two items in order of decreasing number of array range checks and merge the two items and the number of array range checks into one item so as to insert it in the sorted array range check set information. Accordingly, if this process ends, in the case that a plurality of array range checks are merged, a product set of those array range checks (AND) (in the case of a loop, a meet with a range check of a loop variable) is allocated to flags. For following processes, an array range check used as a versioning header (in most cases, VERSION_OR[B] itself) is eliminated from C_IN_OR[B]In most cases, C_IN_OR [B] becomes empty.

In addition, the following process is performed to all the basic blocks thereafter. A set called ALL_FLAG is created as a sum (OR) of all C_IN_OR[B]s. This set information has, as to each item, its basic block number in addition to array range check information.

ALL_FLAG=∪C_IN_OR[B]

Moreover, initially it is as follows:

The number of items of array range check set information in
   ALL_FLAG: n

The maximum number of allocable flags in a processor: fn

TABLE 5

```
if (fn <= 0) {
    <Allocation to flags and invalidation of an array range check are not
    performed.>
} else {
    <Array range check set information in ALL_FLAG is sorted
    by the number of corresponding array range checks and
    elements with one or less array range check are
    eliminated.>
    while (n > fn) {
        <Two items in order of decreasing number of array
        range checks with the same basic block are erased,
        and the two items and the number of range checks are
        merged into one item so as to be inserted in the
        sorted array range check set information.>
        if (there is no item to merge) {
            n = fn;
            break;
        }
        n--;
    }
    <Allocate to each flag array range checks in the array
    range check set information in order of items with
    increasing number of array range checks.
    In case that a plurality of array range checks are
    merged, their product (AND) is allocated.>
    ALL_FLAG -= an array range check to which a flag was
    not allocated
    fn -= n;
}
```

The process in Table 5 is roughly described. Table 5 is a process for further reducing the number of array range checks by using redundant flags. If allocable flags become 0 due to the process in Table 4, etc., the process in Table 5 is not performed. If allocable flags exist, a merge is attempted in ALL_FLAG. For this, as also performed in Table 4, array range checks in ALL_FLAG are sorted by the number of corresponding array range checks. At this time, since it is not effective to allocate a flag to those with one or less array range check, those with one or less array range check are discarded. Two items in order of decreasing number of array range checks with the same basic block are erased, and the two items and the number of array range checks are merged into one item so as to be inserted in the sorted array range check set information. It is repeated until the number of items included in the set information becomes equal to or smaller than the number of flags. However, since they cannot be merged unless there are items with the same basic block, in the case that they cannot be merged, the repetition process is stopped there. Then, array range checks are allocated to each flag in order of items with increasing number of array range checks. If a plurality of array range checks are merged, their product (AND) is allocated. Lastly, the array range checks not allocated to a flag are eliminated from ALL_FLAG. They are used in a later process.

Array range checks in VERSION_OR[B] are allocated to each flag in a process as above. Incidentally, the above allocation method is merely an example and allocation in other methods is also possible. Moreover, the process in Table 5 does not have to be performed.

Step 130 is described next. Here, the first code required for the process (A) is generated as a result of step 120. Namely, a code is generated for storing in each flag results of array range checks of items in array range check set information allocated to the flag by step 120. In case that many array range checks are allocated to one flag, a code is generated for storing ANDed results of the array range checks in the flag.

Step 140 is not described any more since it is simple classification. The process (A) is applicable even in a case that no versioning for a loop, etc. is performed.

In case that a versioning is performed, it moves on to step 150. First, a versioning header is generated here. This versioning header is a place to determine which version to jump to. Since it is supposed here that results of array range checks in VERSION_OR[B] which becomes a versioning header in step 130 are stored in allocated flags, a code for checking those flags is generated. A code is generated for jumping to a version of success if all the allocated flags indicate successful array range checks, and jumping to a version of unsuccess in the case that even one of them indicates unsuccessful array range checks.

Next, a code for a version of successful array range checks and code for a version of unsuccessful array range checks are generated. However, these versions are substantially the same at this stage. Namely, in case that an optimization process is not performed, both versions include one necessary and sufficient array range check for each array access. In case that an optimization process is performed, for each basic block, necessary array range checks are generated for every array access included in the basic block.

In step 160, primarily elimination of redundant array range checks is performed. At the same time, a code for checking a flag of array range checks including a residual array range check which was not eliminated, and for invalidating a code for any residual array range check if the flag indicates success of the array range check is generated. The details of this elimination process of redundant array range checks is described in Appendix D. However, the process in step 320 is modified as follows. Namely, sub-set ALL_FLAG[B] which consists of elements of basic block B extracted from ALL_FLAG is newly defined, and a base variable, a term of an index variable of an index, a minimum constant offset, a maximum constant offset and a corresponding flag name are stored for each array range check in C_GEN[B], C_IN[B], C_OUT[B], VERSION_OR[B] and ALL_FLAG[B]. As to each array range check in C_GEN[B], [None] is stored for [Corresponding Flag Name], and for each array range check in VERSION_OR[B] and ALL_FLAG[B], the flag name allocated in the above-mentioned step 130 is stored. Then, data-flow analysis pursuant to the following expression is performed.

In case that basic block B is not an initial block, as to every P which precedes B,

C_IN[B]=(∩C_OUT[P])∪VERSION_OR[B]∪ALL_FLAG[B]

In case that basic block B is an initial block,

C_IN[B]=VERSION_OR[B]∪ALL_FLAG[B]

C_OUT[B]=C_GEN[B]∪forward(C_IN[B], B)

To explain it briefly, in case that basic block B is not an initial block, a product set of C_OUT[P] is sought as to every P which precedes B, and the sum set of its result, VERSION_OR[B] and ALL_FLAG[B] is C_IN[B]. On the other hand, in case that basic block B is an initial block, since there is no C_OUT[P], the sum set of VERSION_OR[B] and ALL_FLAG[B] is C_IN[B]. If a forward process described in Appendix B is applied to this C_IN[B], the sum set of its results and C_GEN[B] is C_OUT[B].

Step 330 in Appendix D is also modified as follows.

TABLE 6

```
for (for each basic block, an instruction is taken out in program execution
order) {
    switch (instruction) {
        array access instruction:
        for the array range check C
            if (C can be determined as already checked from
                C_IN[B]) {
                if (there is an array range check whose
                    [Corresponding Flag Name] is [None] in a sub-set
                    including C in C_IN[B]) {
                    /* there is an array range check flown from C_GEN */
                        eliminate array range check C;
                } else {
                    generate a code for invalidating array range
                    check C based on a result of [Corresponding Flag Name].
                }
            } else {
                C_IN[B] += C;
            }
        break;
        modify array base variable a;
            for (all C ∈ C_IN[B]) {
                if(lb(a) or ub(a) on modified array base a are included in C) {
                    C_IN[B] –= C;
                }
            }
        break;
        modify index variable v:
            for (all C ∈ C_IN[B]) {
                if (C comprises modified index variable v
                    or expression f(v) of v) {
                    if (index v is modified by i = i+c
                        (c is a positive or negative constant)) {
                        v is replaced by v–c, or f(v) by f(v–c)
                    } else {
                        C_IN[B] –= C;
                    }
                }
            }
        break;
    }
}
```

What is different from Table 30 in Appendix D is the process when an array access instruction in basic block B is taken out. Here, even if array range check C can be determined as already checked in C_IN[B], it is classified according to another check. Namely, if the sub-set including C in C_IN[B] is an array range check added from C_GEN[B], that is, if [Corresponding Flag Name] of the sub-set is [None], array range check C is eliminated, and if not, and if the flag of [Corresponding Flag Name] indicates that the array range check is successful, a code for invalidating the array range check C is generated.

Figures 3, 4:
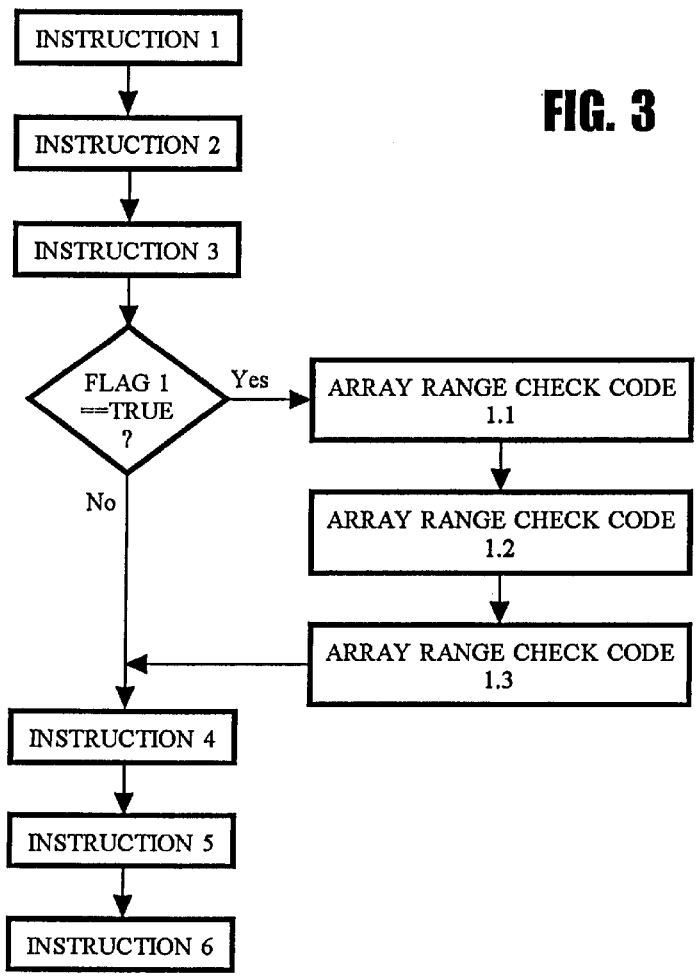
FIG. 3 is a flowchart showing an example of execution order of instructions.
FIG. 4 is a drawing showing actual instructions of FIG. 3.

A case of using an instruction with a predicate in Merced is more concretely described using FIGS. 3 and 4. Here, as in FIG. 3, instructions 1 to 3 are unconditionally executed, while codes 1.1 to 1.3 for array range checks are executed if FLAG1 is TRUE. If FLAG1 is not TRUE, or after executing code 1.3, instruction 4 and thereafter are executed. At this time, Merced executes instructions as in FIG. 4. Namely, a thick lined box in FIG. 4 is one instruction, and an instruction whose left field has FLAG1 written in it means that an instruction is executed when FLAG1 is TRUE and not executed when FLAG1 is FALSE. If the left field is empty, the instruction is unconditionally executed. The instructions in FIG. 4 are executed one by one here in order of FIG. 3, while they are normally executed as one line (three instructions) per cycle.

Furthermore, in case of using a Zero Cycle Branch instruction in Power PC, a code is generated for skipping an array range check corresponding to the flag when the allocated flag is TRUE. For instance, if the allocated flag is Bit 5, the following code is generated for skipping.

bbt 5, SKIP

A code for an array range check

SKIP:

bbt jumps to SKIP if Bit "5" is true, and if not, executes the following code for an array range check.

In this way, the process in step 160 is performed together with an elimination process of redundant array range checks.

Now, the process (A) is described with a concrete example.

TABLE 7

```
i = 0;
while(i < n-2) {
  t = sub1[i] / diag[i];
  diag[i + 1] -= t * sup1[i];
  sup1[i + 1] -= t * sup2[i];
  b [i + 1] -= t * b [i];
  t = sub2[i] / diag[i];
  sub1[i + 1] -= t * sup1[i];
  diag[i + 2] -= t * sup2[i];
  b [i + 2] -= t * b [i];
  i++;
}
```

This is an extraction from an algorithm for solving five-fold diagonal simultaneous equations. Meanwhile, lb(a) refers to a lower bound value of array a, and ub(a) refers to an upper bound value of array a. Also, check( ) means that an array range check inside parentheses is performed. In addition, since a lower bound of an array is always 0 in the Java language, it is used in the following.

If the process in step 110 is performed, VERSION_OR[B] becomes as follows.

check(n−1<=ub(diag))

check(n−1<=ub(b))

check(n−2<=ub(sub1))

check(n−2<=ub(sup1))

check(n−3<=ub(sub2))

check(n−3<=ub(sup2))

A check for a range of a loop variable is 0<=n−3.

If an optimization is performed,

TABLE 8

```
i = 0;
while(i < n-2) {
  check(i <= ub(sub1));
  check(i <= ub(diag));
  t = sub1[i] / diag[i];
  check(i+1 <= ub(diag));
  check(i <= ub(sup1));
  diag[i + 1] -= t * sup1[i];
  check(i+1 <= ub(sup1));
  check(i <= ub(sup2));
  sup1[i + 1] -= t * sup2[i];
  check(i+1 <= ub(b));
  b[i + i] -= t * b[i];
  check(i <= ub(sub2));
  t = sub2[i] / diag[i];
  check(i+1 <= ub(sub1));
  sub1[i + 1] -= t * sup1[i];
  check(i+2 <= ub(diag));
  diag[i + 2] -= t * sup2[i];
```

TABLE 8-continued

```
  check(i+2 <= ub(b));
  b[i + 2] -= t * b[i];
  i++;
}
```

In the process in step 120, first, if VERSION_OR[B] is sorted from the result of Table 8, it becomes as follows.

| Check instructions | Number of range checks |
|---|---|
| n−1 <= ub(diag) | 3 |
| n−1 <= ub(b) | 2 |
| n−2 <= ub(sub1) | 2 |
| n−2 <= ub(sup1) | 2 |
| n−3 <= ub(sub2) | 1 |
| n−3 <= ub(sup2) | 1 |

If these are allocated to four flags (flag1 to flag4) of a processor in the process in step 120, it becomes as follows.

TABLE 9

| Flag | Array range check corresponding to the flag | Number of range checks |
|---|---|---|
| flag1 | 0<=n−3 && n−2<=ub(sub1) && n−2<=ub(sup1) | 4 |
| flag2 | 0 <= n−3 && n−1 <= ub(diag) | 3 |
| flag3 | 0 <= n−3 && n−1 <= ub(b) | 2 |
| flag4 | 0<=n−3 && n−3<=ub(sub2) && n−3<=ub(sup2) | 2 |

In step 130, the following codes are generated by using Table 9.

TABLE 10

```
if (0 <= n-3) {
  flag1 = (n-2 <= ub(sub1) && n-2 <= ub(sup1));
  flag2 = (n-1 <= ub(diag));
  flag3 = (n-1 <= ub(b));
  flag4 = (n-3 <= ub(sub2) && n-3 <= ub(sup2));
} else {
  flag1 = flag2 = flag3 = flag4 = FALSE;
}
```

Meanwhile, it may also be as follows.

TABLE 11

```
flag1 = (n-2 <= ub(sub1) && n-2 <= ub(sup1) && 0 <= n-3);
flag2 = (n-1 <= ub(diag) && 0 <= n-3);
flag3 = (n-1 <= ub(b) && 0 <= n-3);
flag4 = (n-3 <= ub(sub2) && n-3 <= ub(sup2) && 0 <= n-3);
```

If the process in step 150 is performed, it becomes as follows.

TABLE 12

```
i = 0;
if (0 <= n-3) {
  flag1 = (n-2 <= ub(sub1) && n-2 <= ub(sup1));
  flag2 = (n-1 <= ub(diag));
  flag3 = (n-1 <= ub(b));
  flag4 = (n-3 <= ub(sub2) && n-3 <= ub(sup2)):
} else {
  flag1 = flag2 = flag3 = flag4 = FALSE;
}
```

TABLE 12-continued

```
    if (flag1 && flag2 && flag3 && flag4)) {
        while(i <= n-2) {
            check(i <= ub(sub1));
            check(i <= ub(diag));
            t = sub1[i] / diag[i];
            check(i+1 <= ub(diag));
            check(i <= ub(sup1));
            diag[i + 1] -= t * sup1[i];
            check(i+1 <= ub(sup1));
            check(i <= ub(sup2));
            sup1[i + 1] -= t * sup2[i];
            check(i+1 <= ub(b));
            b[i + 1] -= t * b[i];
            check(i <= ub(sub2));
            t = sub2[i] / diag[i];
            check(i+1 <= ub(sub1));
            sub1[i + 1] -= t * sup1[i];
            check(i+2 <= ub(diag);
            diag[i + 2] -= t * sup2[i];
            check(i+2 <= ub(b));
            b[i + 2] -= t * b[i];
            i++;
    } else {
        while(i <= n-2) {
            check(i <= ub(sub1));
            check(i <= ub(diag));
            t = sub1[i] / diag[i];
            check(i+1 <= ub(diag));
            check(i <= ub(sup1));
            diag[i + 1] -= t * sup1[i];
            check(i+1 <= ub(sup1));
            check(i <= ub(sup2));
            sup1[i + 1] -= t * sup2[i];
            check(i+1 <= ub(b));
            b[i + 1] -= t * b[i];
            check(i <= ub(sub2));
            t = sub2[i] / diag[i];
            check(i+1 <= ub(sub1));
            sub1[i + 1] -= t * sup1[i];
            check(i+2 <= ub(diag);
            diag[i + 2] -= t * sup2[i];
            check(i+2 <= ub(b));
            b[i + 2] -= t * b[i];
            i++;
        }
```

Lastly, if the process in step 160 is performed, it becomes as follows.

TABLE 13

```
i = 0;
if (0 <= n - 3) {
    flag1 = (n - 2 <= ub(sub1) && n - 2 <= ub(sup1));
    flag2 = (n - 1 <= ub(diag));
    flag3 = (n - 1 <= ub(b));
    flag4 = (n - 3 <= ub(sub2) && n - 3 <= ub(sup2));
} else {
    flag1 = flag2 = flag3 = flag4 = FALSE;
}
if (flag1 && flag2 && flag3 && flag4)) {
    while(i < n - 2) {
        t = sub1[i] / diag[i];
        diag [i + 1] -= t * sup1[i];
        sup1 [i + 1] -= t * sup2[i];
        b [i + 1] -= t * b[i];
        t = sub2 [i] / diag [i]
        sub1 [i + 1] -= t * sup1 [i]
        diag [i + 2] -= t * sup2 [i];
        b [i + 2] -= t * b[i]
        i++;
    } else {
        while(i < n - 2) {
            if (!flag1) check (i <= ub(sub1));
            if (!flag2) check (i <= ub(diag));
            t = sub1 [i] / diag [i]
```

TABLE 13-continued

```
            if (!flag2) check (i+1 <= ub(diag));
            if (!flag1) check (i <= ub(sup1));
            diag[i + 1] -= t * sup1[i];
            if (!flag1) check (i+1 <= ub(sup1));
            if (!flag4) check (i <= ub(sup2));
            sup1[i + 1] -= t * sup2[i];
            if (!flag3) check (i+1 <= ub(b));
            b [i + 1] -= t * b[i];
            if (!flag4) check (i <= ub(sub2));
            t = sub2 [i] / diag [i]
            if (!flag1) check (i+1 <= ub(sub1));
            sub1 [i + i] -= t * sup1[i];
            if (!flag2) check (i+2 <= ub(diag);
            diag [i + 2] -= t * sup2[i];
            if (!flag3) check (i+2 <= ub(b));
            b [i + 2] -= t * b[i]
            i++
}
```

For instance, "if (!flag3) check(i+2<=ub(b));" is a code for checking a flag and ignoring check (i+2<=ub(b)) if array range checks allocated to the flag indicate a successful check.

As it is clear from step 140, the present invention is applicable even in the case that no versioning is performed. Accordingly, Table 7 becomes as follows.

TABLE 14

```
i = 0;
if (0 <= n - 3) {
    flag1 = (n - 2 <= ub(sub1) && n - 2 <= ub(sup1));
    flag2 = (n - 1 <= ub(diag));
    flag3 = (n - 1 <= ub(b));
    flag4 = (n - 3 <= ub(sub2) && n - 3 <= ub(sup2));
} else {
    flag1 = flag2 = flag3 = flag4 = FALSE;
}
while (i <= n - 2) {
    if (!flag1) check (i <= ub(sub1));
    if (!flag2) check (i <= ub(diag));
    t = sub1 [i] diag [i]
    if (!flag2) check (i+1 <= ub(diag));
    if (!flag1) check (i <= ub(sup1));
    diag[i + 1] -= t * sup1[i];
    if (!flag1) check (i+1 <= ub(sup1));
    if (!flag4) check (i <= ub(sup2));
    sup1[i + 1] -= t * sup2[i];
    if (!flag3) check (i+1 <= ub(b));
    b [i + 1] -= t * b[i];
    if (!flag4) check (i <= ub(sub2));
    t = sub2 [i] / diag [i]
    if (!flag1) check (i+1 <= ub(sub1));
    sub1 [i + i] -= t * sup1[i];
    if (!flag2) check (i+2 <= ub(diag);
    diag [i + 2] -= t * sup2[i];
    if (!flag3) check (i+2 <= ub(b));
    b [i + 2] -= t * b[i]
    i++
}
```

Furthermore, the process (A) is applicable even if it is not a loop, and for instance, without the while statement in Table 7, it may do without performing an actual array range check and be sped up only by checking a flag likewise.

Figure 5:
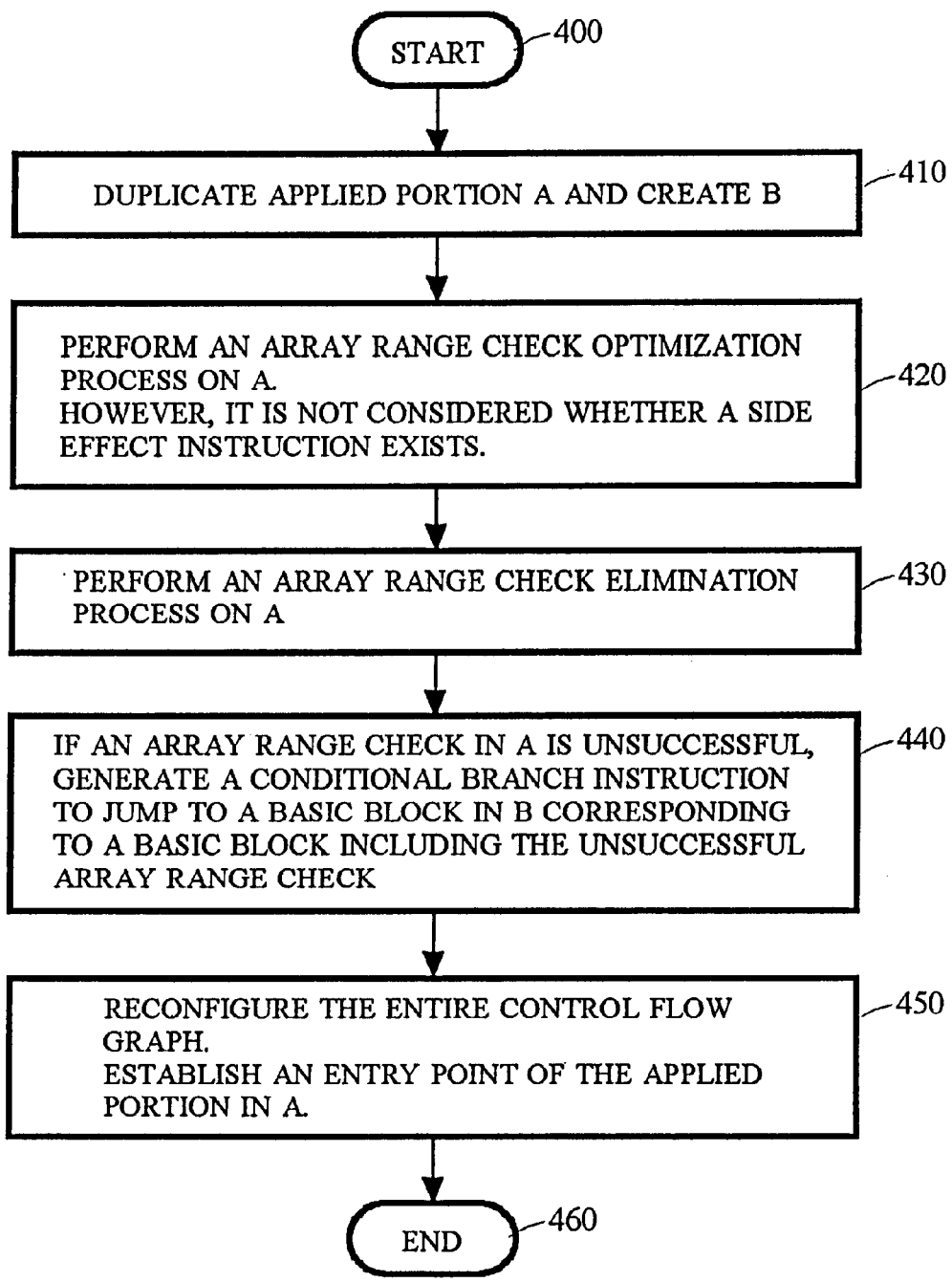
FIG. 5 is a flowchart showing a processing of the second form (process (B)) of the present invention.

(B) A process for combining array range checks as much as possible without considering existence of side effect instructions The process (A) is primarily applicable to a case where a flag of a processor can be used as above. There are also cases where a versioning is not possible. This process (B) is effective in a case where the process (A) cannot be used. FIG. 5 shows the flow of this process (B). First, portion A to which this process is applicable is replicated, and corresponding portion B of the program is created and stored in a storage (step 410). Next, an optimization process of an array range check (Appendix C) is performed. While the process described in Appendix C is performed considering whether or not there is an instruction which may cause a side effect, here it is not taken into consideration. The difference from Appendix C is that the process of changing C_GEN [B] or C_OUT[B] to φ is not performed in Tables 25 and 26. Thereafter, an elimination process of array range checks is performed on portion A of the program (step 430). This elimination process is the process described in Appendix D. Then, a conditional branch instruction is generated and stored in a storage, which, if an array range check remaining in portion A of the program is unsuccessful, jumps to a basic block in portion B of the program corresponding to the basic block including the unsuccessful array range check (step 440). An entire control flow graph is reconfigured thereafter, and on that occasion, an entry point of the portion to which this process is applied is established in A (step 450). This concludes the portion related to this application, while thereafter, conventionally practiced register assignment and code generation are performed on A and B based on the reconfigured control flow graph.

By performing a process as above, the number of array range checks may be reduced since array range checks can be collected without considering an instruction which may cause a side effect. Accordingly, if no exception due to an unsuccessful array range check occurs at execution time, execution is sped up since only A is executed. Also, in case that an exception actually occurs, a code in B which does not optimize an array range check is executed, and there arises no problem concerning an instruction causing a side effect due to an occurrence of an exception at a correct place. Moreover, even if an exception occurs in a loop (for instance, in case of a program which, in sequentially inputting initial values in an array, sets a loop whose iteration number exceeds an array range and causes an array access exceeding the array range to finish input of initial values), control moves to B only at execution time of the final iteration where an exception actually occurs. Thus, execution of the loop till then is in A, so execution speed of the entire loop can be increased.

An application example of the above process is here. This process is applied to a program as follows.

TABLE 15

```
i = 0;
while(TRUE) {
    switch (a[i]) {
        case 1:
            a [i+1] = 5;
            i += 2;
            break;
        case 2:
            a [i+1] = 10;
            a [i+2] = 20;
            i += 3;
            break;
        case 3:
            a [i+1] = 100;
            a [i+2] = 200;
            a [i+3] = 300;
            i += 4;
            break;
        default:
            System.err.println("error!");
        case 0:
            return;
    }
}
return;
```

As to Table 15, a versioning for a loop cannot be performed since the range of i is not fixed. If an optimization process in Appendix C is performed to this program, there is a possibility that the array access of cases 1 to 3 may cause a side effect, so array range checks cannot be combined exceeding this. If steps 410 to 430 are performed, it becomes as follows.

TABLE 16

```
i = 0;
while (TRUE) {
    check (i <= ub(a));
    switch (a [i]) {
        case 1:
            check (i+2 <= ub(a));
            a [i+1] = 5;
            i += 2;
            break;
        case 2:
            check (i+3 <= ub(a));
            a [i+1] = 10;
            a [i+2] = 20;
            i += 3;
            break;
        case 3:
            check (i+4 <= ub(a));
            a [i+1] = 100;
            a [i+2] = 200;
            a [i+3] = 300;
            i += 4;
            break;
        default:
            System.err.println("error!");
        case 0:
            return;
    }
}
return;
i = 0;
while(TRUE) {
    check (i <= ub(a));
    switch(a [i]) {
        case 1:
            check (i+1 <= ub(a));
            a [i+1] = 5;
            i += 2;
            break;
        case 2:
            check (i+1 <= ub(a));
            a [i+1] = 10;
            check (i+2 <= ub(a));
            a [i+2] = 20;
            i += 3;
            break;
        case 3:
            check (i+1 <= ub(a));
            a [i+1] = 100;
            check (i+2 <= ub(a));
            a [i+2] = 200;
            check (i+3 <= ub(a));
            a [i+3] = 300;
            i += 4;
    break;
        default:
            System.err.println("error!");
        case 0:
            return;
    }
}
return;
```

Meanwhile, in the case 3 for instance, there are the following differences between a case of performing an optimization process in Appendix C and a case of performing an optimization process corrected in process (B).

|  | Process B | Appendix C |
| --- | --- | --- |
| C_GEN | (a, i, 1, 3) | (a, i, 1, 1) |
| C_IN | (a, i, 1, 4) | (a, i, 1, 1) |
| C_OUT | (a, i, 0, 0) | (a, i, 0, 0) |

The meaning in the parentheses are, in order from left, array base variable, term of index variable, minimum constant index and maximum constant index variables. The one lastly used in an optimization process is C_IN[B]. Since process B has a larger maximum constant index variable, more array indexes can be combined. Thereafter, C_IN[B] is also calculated for elimination process of redundant array indexes. In C_IN[B] in case 3, it will be the same as the above result, so array range checks between i+1 and i+4 of portion A of the program is eliminated.

Lastly, if the processing from step 440 on is performed, it becomes as follows.

TABLE 17

```
/* Entry Point */
i = 0;
while(TRUE) {
    check (i <= ub(a) );
    switch (a [i]) {
    case 1:
        if (i+2 > ub(a)) goto EXACT_CHECK1; - - - (1)
        a [i+1] = 5;
        i += 2;
        break;
    case 2:
        if (i+3 > ub(a)) goto EXACT_CHECK2; - - - (2)
        a [i+1] = 10;
        a [i+2] = 20;
        i += 3;
        break;
    case 3:
        if (i+4 > ub(a)) goto EXACT_CHECK3; - - - (3)
        a [i+1] = 100;
        a [i+2] = 200;
        a [i+3] = 300;
        i += 4;
        break;
    default:
        System.err.println("error!");
    case 0:
        return;
    }
}
return;
/* the portion which actually causes exceptions as to (1), (2) and (3) */
i = 0;
while (TRUE){
    check (i <= ub(a));
    switch(a [i]) {
    case 1:
        EXACT_CHECK1; - - - (4)
        check (i+1 <= ub(a));
        a [i+1] = 5;
        i += 2;
        break;
    case 2:
        EXACT_CHECK2; - - - (5)
        check (i+1 <= ub(a));
        a [i+1] = 10;
        check (i+2 <= ub(a));
        a [i+2] = 20;
        i += 3;
        break;
    case 3:
        EXACT_CHECK3; - - - (6)
        check (i+1 <= ub(a));
        a [i+1] = 100;
```

TABLE 17-continued

```
        check (i+2 <= ub(a));
        a [i+2] = 200;
        check (i+3 <= ub(a));
        a [i+3] = 300;
        i += 4;
        break;
    default:
        System.err.println("error!");
    case 0:
        return;
    }
}
return;
```

(1) to (3) are the codes generated in step 440. Compared with Table 16, the condition as an inequality is different, namely jumping to portion B of the program if an array range check is unsuccessful.

(C) A process for versioning by using information of array range checks for array accesses which are always performed even if passing through any execution path in a loop If versioning is performed by using information of array range checks for array accesses which are always performed even if passing through any execution path in a loop, it is possible to prevent moving to a version which performs a strict array range check except a case where an exception actually occurs in an array range check. The processing flow of this process is described by using FIG. 6.

First, VERSION_AND[B] which is array range check set information for array accesses which are always performed even if passing through any execution path in a loop is generated at an entry point of the loop where a versioning is performed (step 510). This VERSION_AND[B] is stored in a storage. Then, a versioning header is generated and stored in a storage by using this VERSION_AND[B] (step 520). Thereafter, a version in the case that an array range check in a versioning header is successful and a version in the case that it is unsuccessful are generated and stored in a storage (step 530). These versions are substantially the same as this point. However, the aforementioned VERSION_AND[B] is effective at an entry point of the loop of a version in the case of success, and it is φ for a version in the case of unsuccess. In such a state, an elimination process of redundant array range checks is performed (step 540). In this way, in a version where an array range check for a versioning header is successful, array range checks for array accesses which are always performed even if passing through any execution path are eliminated, while, in a version where it is unsuccessful, only overlapping array range checks are eliminated. Execution speed of the successful version becomes faster.

Figure 6:
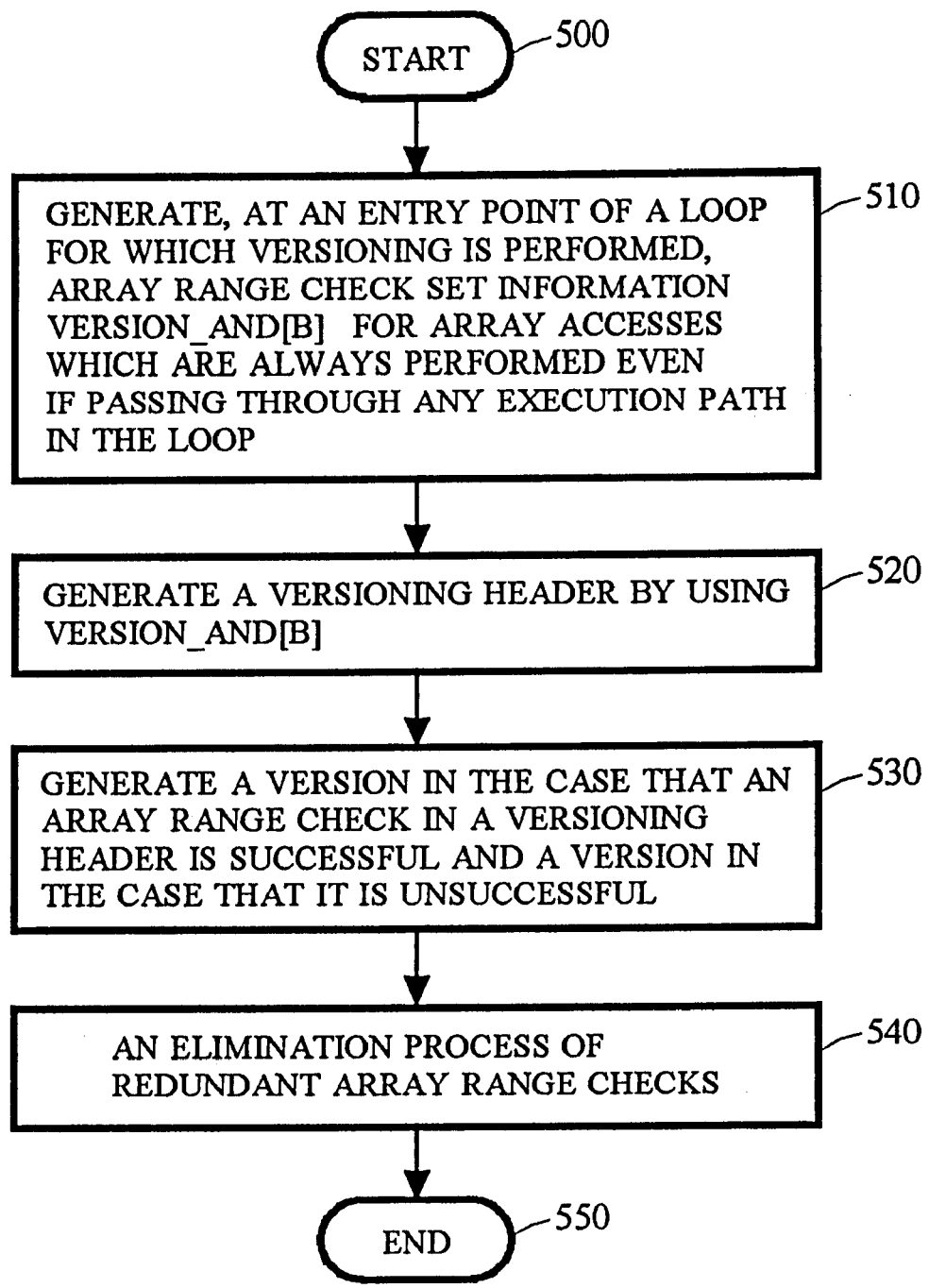
FIG. 6 is a flowchart showing a processing of the third form (process (C)) of the present invention.

In the process in FIG. 6, an elimination process of array range checks is performed not only in a version where an array range check for a versioning header is successful but also in a version where it is unsuccessful, but an elimination process may be performed only in a successful version. Since array range checks are substantially reduced in a successful version, execution speed becomes faster.

Each step in FIG. 6 is described in detail. First, in step 510, VERSION_AND[B] is obtained. While VERSION_OR[B] was obtained in the process (A), here, a product set is calculated in a certain portion where a sum set in the process (A) was obtained.

In process (1) in step 510, while in principle handling as not subject to this step an array range check for an instruction to modify an array index or an array base, array range check set C_GEN[B] at the beginning of a basic block is collected in reverse order of the program execution. However, in case that an array index variable is modified to v=v+c (c is a positive or negative constant), not regarding it as not subject to this step, an array index expression f(v) in set information C_GEN[B] is recalculated as f(v+c) and is replaced. The pseudocode in Table 3 can be used for this process (1).

Next, process (2) in step 510 is described. In this process (2) in step 510, data-flow analysis with the following expression is performed by using C_GEN[B] collected as above to seek C_IN_AND[B].

For every S which is S∈Succ(B),
C_OUT_AND[B]=∩C_IN_AND[S]
C_IN_AND[B]=C_GEN[B]∪backward(C_OUT_AND[B], B)

Succ(B) means every basic block immediately following B.

The above expression indicates the following. An array range check set C_OUT_AND[B] at the end of a certain basic block B is a product set of array range check sets C_IN_AND[S] at the beginning of all the basic blocks S which are S C Succ(B). In addition, C_OUT_AND[B] newly becomes a set, backward(C_OUT_AND[B], B) after being modified according to predetermined modification to an array index performed in basic block B by a process mentioned later. A sum set of this set backward(C_OUT_AND[B], B) and the earlier obtained C_GEN[B] is C_IN_AND[B]. What is ultimately necessary is this C_IN_AND[B].

Processing of backward(C_OUT_AND[B], B) is the same as Appendix A. However, while it was C_IN_OR[B] in Appendix A, it is replaced by C_IN_AND[B].

In process (3) in step 510, data-flow analysis with the following expression is performed by using C_IN_AND[B] created in process (2) so as to create FLAG_IN[B].

For every P which is P∈Pred(B),
FLAG_IN[B]=∩FLAG_OUT[P]
FLAG_OUT[B]=C_N_AND[B]∪forward(FLAG_IN[B], B)

Pred(B) means every basic block immediately before B.

The above expression indicates the following a product set of sets FLAG_OUT[P] at the end of all the basic blocks P immediately before basic block B is a set FLAG_IN[B]. This set FLAG_IN[B] is processed by forward(FLAG_IN[B], B), and a sum set of its result and C_IN_AND[B] obtained in process (2) is FLAG_OUT[B].

Processing of forward(FLAG_IN[B], B) is the same as Appendix B.

In process (4) in step 510, the following expression is performed for every basic block to eliminate redundant array set information in C_IN_AND[B].

C_IN_AND[B]=C_IN_AND[B]-FLAG_IN[B]

In process (5) in step 510, by using C_IN_AND[B] created in process (4), based on an invariant array access in a loop, and a range a loop variable can take in the case of an array access for which such a range can be identified, VERSION_AND[B] which is array range check set information at the entry point of the loop is calculated. This VERSION_OR[B] is an array range check in a versioning header. For instance, if the loop variable is i and the range it can take is found to be from 1 to less than n, VERSION_AND[B] is created by checking ub(a) in the case of i=n-1, and lb(a) as i=1. This VERSION_OR[B] generating step is an output in step 510.

Next, in step 520, just as a versioning header was created by using VERSION_OR[B] in the process (A), a versioning header is created here by using VERSION_AND[B].

Processing in step 530 is substantially to copy a loop which is a subject for versioning. However, as to a version in the case that an array range check for a versioning header is unsuccessful, VERSION_AND[B] is empty.

Figure 14:
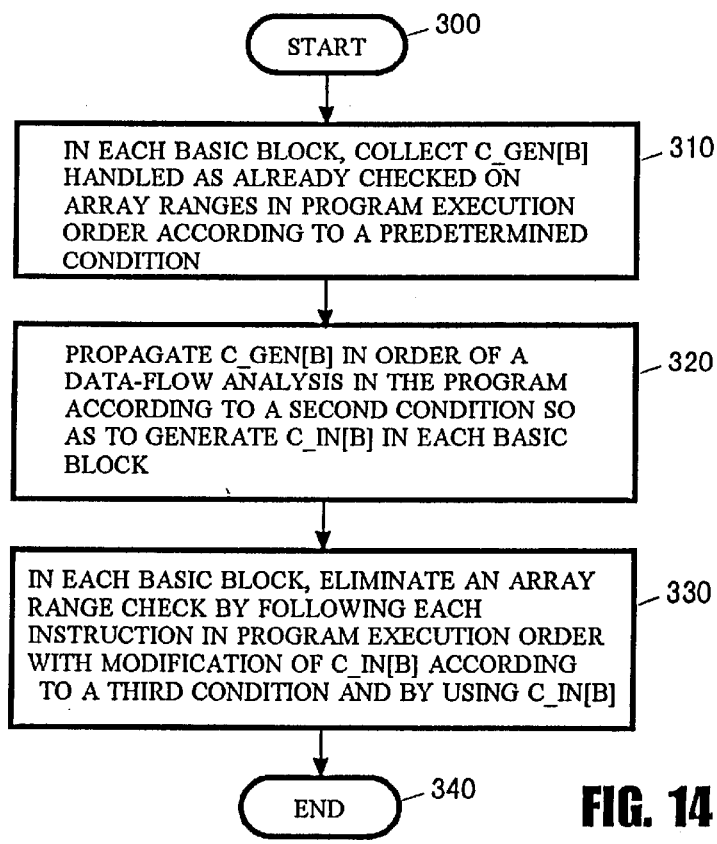
FIG. 14 is a flowchart representing a main processing of the portion for performing data-flow analysis in program execution order an obtaining information of array ranges already checked so as tho eliminate a redundant array range check from the information.

In step 540, elimination of redundant array range checks is performed. This is basically to perform the process of array range checks included in Appendix D. However, the process in step 320 in FIG. 14 is modified as follows. Namely, data-flow analysis with the following expression is performed in step 320.

For every P∈Pred(B), in case that B is not an initial block,
C_IN[B]=(∩C_OUT[P])∪VERSION_AND[B]

In case that B is an initial block,
C_IN[B]=VERSION_AND[B]
C_OUT[B]=C_GEN[B]∪forward(C_IN[B], B)

To explain these briefly, as to every basic block P which precedes basic block B, in case that basic block B is not an initial block, a product set of C_OUT[P] is sought, and the sum set of its result and VERSION_AND[B] is calculated as C_IN[B]. On the other hand, in case that the basic block is an initial block, C_IN[B] is the same as VERSION_AND[B]. Then, C_OUT[B] is calculated with C_GEN[B] and forward(C_IN[B], B). forward(C_IN[B], B) can be calculated by the process in Appendix B. However, FLAG_IN[B] is replaced by C_IN[B].

Processes other than this are the same as Appendix D. Accordingly, when this process ends, the version in the case that an array range check in a versioning header is successful remains for array range checks which are only executed through a certain execution path in a loop performing a versioning, but other array range checks are mostly eliminated so that the number of array range checks is reduced. On the other hand, as to the version in the case that it is unsuccessful, only overlapping array range checks are eliminated.

A concrete example of the above processing is described below. For instance, the process is performed tho the following program.

TABLE 18

```
total = 0;
for (i = s; i < n; i++) {
    if (a [i] == 0) {
        a [i] = a [i-1] = a [i-2]; - - - (1)
    }
    total += a [i] + c [k];
    b[i] = total;
}
```

If steps 510 is performed, VERSION_AND[B] becomes as follows.

s<=n-1
s>=lb(a)
n-1<=ub(a)
k>=lb(c)
k<=ub(c)
s>=lb(b)
n-1<=ub(b)

Accordingly, a versioning header in step 520 is as follows.
if (s<=n-1 &&
    s>=lb(a) &&
    n-1<=ub(a) &&
    k>=lb(c) &&
    k<=ub(c) &&
    s>=lb(b) &&
    n-1<=ub(b))

If steps 530 and 540 are performed, it becomes as follows.

TABLE 19

```
total = 0;
if (s <= n - 1 &&
    s >= lb(a) &&
        n - 1 <= ub(a) &&
        k >= lb(c) &&
        k <= ub(c) &&
        s >= lb(b) &&
        n - 1 <= ub(b)) {
    /* flag1 = (s - 2 >= lb(a)); */ - - - (1)
    for (i = s; i < n; i++) {
        if (a [i] == 0) {
            /* if (!flag1) */ - - - (1)
            check (i - 2 >= lb(a));
            a [i] = a [i - 1] + a [i - 2];
        }
        total += a [i] + c [k];
        b[i]= total;
    }
} else {
    for (i = s; i < n; i++) {
        check (i >= lb(a));
        check (i <= ub(a));
        if (a [i] == 0) {
            check (i - 2 >= lb(a));
            a [i] = a [i - 1] + a [i - 2];
        }
        check (k >= lb(c));
        check (k <= ub(c));
        total += a [i] + c [k];
        check (i >= lb(b));
        check (i <= ub(b));
        b[i]= total;
    }
}
```

As it is clear in Table 19, if an array range check in a versioning header is successful, there is one array range check in the loop. On the other hand, if it is not successful, many array range checks are required.

Figure 7:
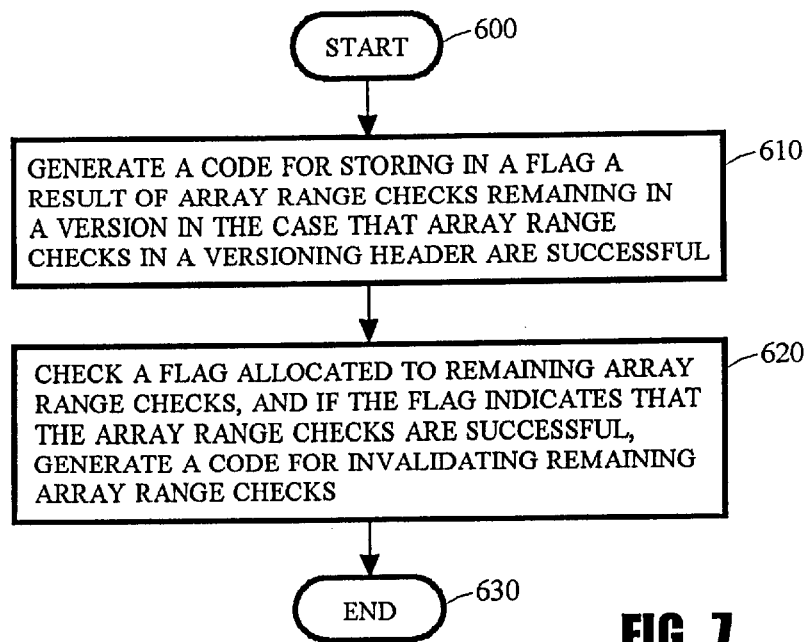
FIG. 7 is a flowchart showing example 1 of a processing in the case of combining the third and first forms of the present invention.

This process (C) can also be performed in combination with process (A). An example is (1) in Table 19. Two methods are thinkable for this. One method is, after an elimination process of redundant array range checks in step 540, generating a code for storing in a flag a result of an array range check for a versioning header remaining in the version when it is successful (step 610, FIG. 7), generating a code for checking a flag allocated to the remaining array range checks, and for invalidating the remaining array range checks (step 620). The generated codes are stored in a storage. Thus, a code such as (1) in Table 19 is generated.

Figure 8:
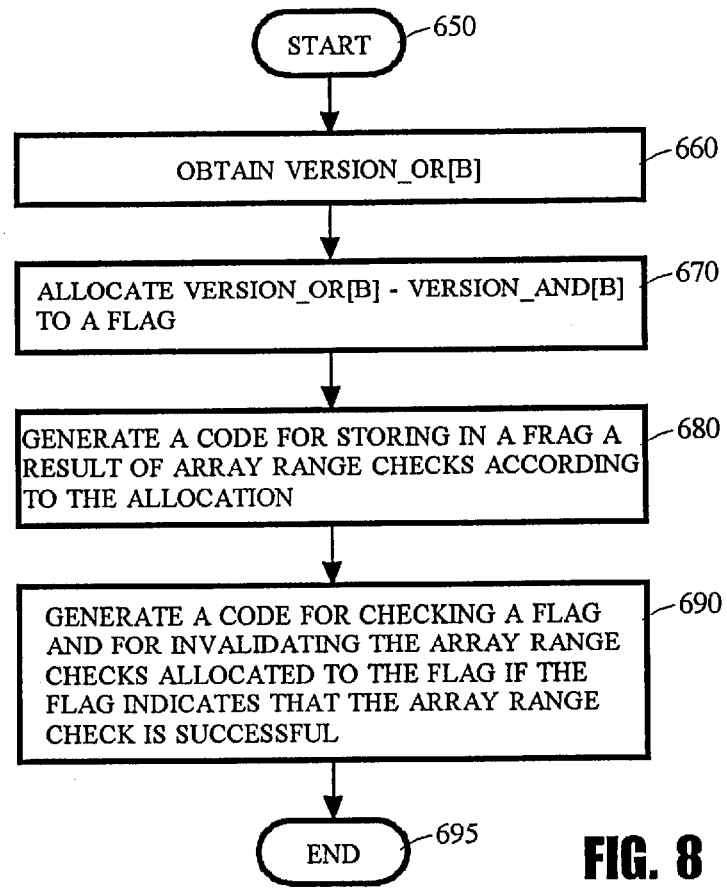
FIG. 8 is a flowchart showing example 2 of a processing in the case of combining the third and first forms of the present invention.

In the other method, though with the same result, array range checks are collected not restrictively for array range checks for array accesses which are always performed even if passing through any execution path in a loop performing a versioning, and VERSION_OR[B] is calculated (step 660, FIG. 8), and VERSION_OR[B]–VERSION_AND[B] is allocated to a flag (step 670). Then, a code is generated for storing in a flag a result of an array range check according to allocation (step 680). A code is generated for checking the flag, and for invalidating the array range checks allocated to the flag if the flag indicates success of the array range checks (step 690). VERSION_OR[B] and the generated codes are stored in a storage.

Figure 9:
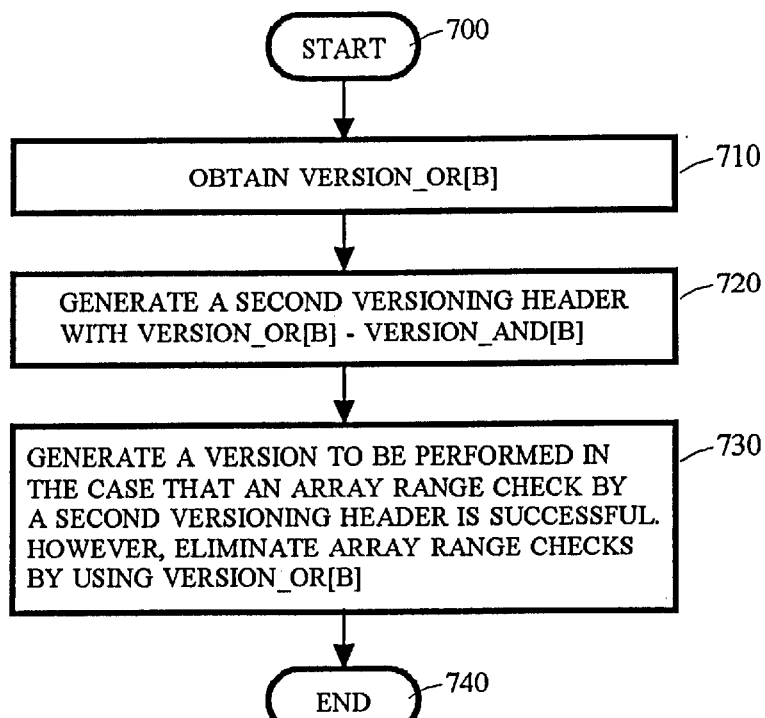
FIG. 9 is a flowchart showing a processing in the case of dividing into three versions in the third form of the present invention.

It is possible to divide into three versions by using VERSION_OR[B]. The following steps are executed in this case (FIG. 9). First, VERSION_OR[B] is acquired and stored in a storage (step 710). Then, VERSION_OR[B]–VERSION_AND[B] is acquired, and with this a second versioning header is generated and stored in a storage (step 720). A version to be executed in the case that an array range check by the second versioning header is successful is generated and stored in a storage (step 730). However, VERSION_OR[B] is used to eliminate array range checks. This is performed by changing VERSION_AND[B] in step 540 (FIG. 6) to VERSION_OR[B]. Such a code is generated and put together as follows. This process functions in the case that VERSION_AND[B] is not ø and VERSION_AND[B] are not the same.

TABLE 20

<A versioning header using VERSION_AND [B].> - - - (1)
<When (1) is successful>
<A versioning header using VERSION_OR [B] –
VERSION_AND [B].> - - - (2)
<A version when (2) is successful.
However, array range checks are eliminated based on
VERSION_OR [B].> - - - (3)
<A version when (2) is not successful.
However, array range checks are eliminated based on
VERSION_OR [B].> - - - (4)
<A version when (1) is not successful.
However, array range checks are eliminated by
VERSION_AND [B] as ø.> - - - (5)

In this way, (2) and (3) in Table 20 are sought in FIG. 9. Since the remaining portion is sought in FIG. 6, it is necessary to put the whole together so as to be like Table 20.

If Table 18 is processed with FIG. 6 and FIG. 9, it becomes as follows.

TABLE 21

```
total = 0;
if (s <= n - 1 &&
    s >= lb(a) &&
    n - 1 <= ub(a) &&
    k >= lb(c) &&
    k <= ub(c) &&
    s >= lb(b) &&
    n - 1 <= ub(b)) {
    /*a header with VERSION_OR [B] – VERSION_AND [B]*/
    if (s - 2 >= lb(a)) {
        /*a version with elimination based on VERSION_OR [B] */
        for (i = s; i < n; i++) {
            if (a [i] == 0) {
                a [i] = a [i - 1] + a [i - 2];
            }
            total += a [i] + c [k];
            b[i] = total;
        }
    } else {
        /*a version with elimination based on VERSION_AND [B] */
        for (i = s; i < n; i++) {
            if (a [i] == 0) {
                check (i - 2 >= lb(a));
                a [i] = a [i - 1] + a [i - 2];
            }
            total += a [i] + c [k];
            b [i] = total;
        }
    }
} else {
    for (i = s; i < n; i++) {
        check (i >= lb(a));
        check (i <= ub(a));
        if (a [i] == 0) {
            check (i - 2 >= lb(a));
            a [i] = a [i - 1] + a [i - 2];
        }
        check (k >= lb(c));
        check (k <= ub(c));
        total += a [i] + c [k];
        check (i >= lb(b));
        check (i <= ub(b));
        b [i]= total;
    }
}
```

As it is clear in Table 21, the code size becomes almost three times larger. To make three versions in this way, contents of the process in the loop must be simple.

Figure 10:
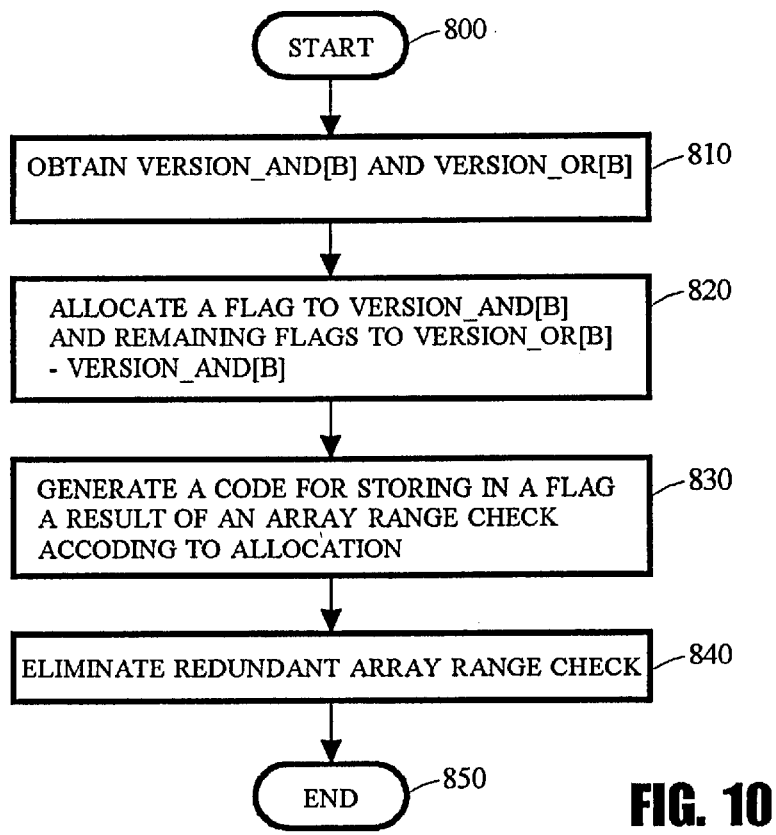
FIG. 10 is a flowchart showing a processing in the case of combining the first and third forms of the present invention when no versioning is performed.

This process (C) can also be performed in combination with process (A), in the case that no versioning is performed. The process is described using FIG. 10. VERSION_OR[B] and VERSION_AND[B] explained earlier are acquired and stored in a storage (step 810). Flags are allocated to VERSION_AND[B], and one flag or a plurality of flags are allocated to VERSION_OR[B]–VERSION_AND[B] by the process in step 120 in FIG. 2 (step 820). According to the above allocation, a code is generated for storing in each flag a result of an allocated array range check, and stored in a storage (step 830). Then, a process for eliminating redundant array range checks is performed according to step 160 in FIG. 2 (step 840). This can speed up the process even in the case that no versioning is performed. If the process in FIG. 10 is performed to Table 18, it becomes as follows.

TABLE 22

```
flag1 = (s <= n - 1 && s >= lb(a) && n - i <= ub(a) &&
        k >= lb(c) && k <= ub(c) &&
        s >= lb(b) && n - 1 <= ub(b))
flag2 = (flag1 && (s - 2 >= lb(a)));
for (i = s; i < n; i++) {
    if (!flag1) {
        check (i >= lb(a));
        check (i <= ub(a));
    }
    if (a [i] == 0) {
        if (!flag2) check (i - 2 >= lb(a));
        a [i] = a [i - 1] + a [i - 2];
    }
    if (!flag1) {
        check (k >= lb(c));
        check (k <= ub(c));
    }
    total += a [i] + c [k];
    if (!flag1) {
        check (i >= lb(b));
        check (i <= ub(b));
    }
    b[i] = total;
}
```

While a versioning for a loop was described above, process (C) may also apply to portions others than a loop.

An important advantage of the present invention is that number of array range checks could successfully be further reduced, and execution speed could be increased.

Also, a method could successfully be provided for reducing the number of array range checks at execution time and allowing execution at increased speed by performing a two-phased check, namely to perform a wide range check by combining a plurality of array range checks, and performing a strict range check in the case that the wide range check is unsuccessful.

In addition, a method could successfully be provided for performing a versioning by using array access information which is always accessed even if passing through any execution path in a loop.

Appendix A
backward(C_OUT_OR[B], B) is Obtained by the Following Pseudocode.

TABLE 23

```
backward(C_OUT_OR[B], B) {
    T = 0;
    for (each array range check C c C_OUT_OR[B]) {
        case C of
        lb <= v:
            case AFFECT(B, v) of
                unchanged: T = T ∪ { lb <= v }
                increment: if added value C is a constant then
                                T = T ∪ { lb <= v + c }
                            /* otherwise not put into T */
```

TABLE 23-continued

```
                decrement: if subtracted value C is a constant then
                                T = T ∪ { lb <= v - c }
                            else
                                T = T ∪ { lb <= v }
                multiply: /* not put into T */
                div > 1: T = T ∪ { lb <= v }
                div < 1: /* not put into T */
                changed: /* not put into T */
            end case
        v <= ub:
            case AFFECT(B, v) of
                unchanged: T = T ∪ { v <= ub }
                increment: if added value C is a constant then
                                T = T ∪ { v + c <= ub }
                            else
                                T = T ∪ { v <= ub }
                decrement: if subtracted value C is a constant then
                                T = T ∪ { v - c <= ub }
                            /* otherwise not put into T */
                multiply: T = T ∪ { v <= ub }
                div > 1: /* not put into T */
                div < 1: T = T ∪ { v <= ub }
                changed: /* not put into T */
            end case
        lb <= f(v)
            case AFFECT(B, v) of
                unchanged: T = T ∪ { lb <= f(v) }
                increment: if f(v) is a monotonic function and
                              added value C is a constant then
                                T = T ∪ { lb <= f(v + c) }
                            else
                                if v increases f(v) decreases then
                                    T = T ∪ { lb <= f(v) }
                decrement: if f(v) is a monotonic function and
                              subtracted value C is a constant then
                                T = T ∪ { lb <= f(v - c) }
                            else
                                if v decreases f(v) also decreases then
                                    T = T ∪ { lb <= f(v) }
                multiply: div < 1:
                            if v increases f(v) decreases then
                                T = T ∪ { lb <= f(v) }
                          div > 1: if v decreases f(v) also decreases then
                                T = T ∪ { lb <= f(v) }
                changed: /* not put into T */
            end case
        f(v) <= ub:
            case AFFECT(B, v) of
                unchanged: T = T ∪ { f(v) <= ub }
                increment: if f(v) is a monotonic function and
                              added value C is a constant then
                                T = T ∪ { f(v + c) <= ub }
                            else
                                if v increases f(v) also increases then
                                    T = T ∪ { f(v) <= ub }
                decrement: if f(v) is a monotonic function and
                              subtracted value C is a constant then
                                T = T ∪ { f(v - c) <= ub }
                            else
                                if v decreases f(v) increases then
                                    T = T ∪ { f(v) <= ub }
                multiply: div < 1:
                            if v increases f(v) also increases then
                                T = T ∪ { f(v) <= ub }
                          div > 1: if v decreases f(v) increases then
                                T = T ∪ { f(v) <= ub }
                changed: /* not put into T */
            end case
        end case
    }
    return(T)
}
```

The final output of backward(C_OUT_OR[B], B) is T. backward(C_OUT_OR[B], B) is roughly divided into four parts depending on the contents of array range checks included in C_OUT_OR[B]. Namely, it is the cases of $lb \leq v$ and $v \leq ub$ as to array index variable v, and the cases of $lb \leq f(v)$ and $f(v) \leq ub$ as to array index $f(v)$. Each case is further divided by operation for array index variable v (AFFECT(B,v) in Table 23. B indicates the basic block being processed). Each case is described as follows.

(1) The Case of $lb \leq v$

If there is no operation for array index variable v (unchanged), $lb \leq v$ is put as is into array range check set T. If the array index is a constant, it is included in this unchanged. In the case of an operation of incrementing array index variable v (increment), it is determined whether added value c is a constant. If added value c is a constant, $lb \leq v+c$ is put into T. In case of any operation of incrementing v other than this, this invention does not handle it, so the array range check is not put into T. In the case of an operation of decrementing array index variable v (decrement), it is determined whether subtracted value c is a constant. If subtracted value c is a constant, $lb \leq v-c$ is put into T. In case of any operation of decrementing v other than this, $lb \leq v$ is put into T. If array index variable v is multiplied (multiply), this invention cannot handle it, so the array range check is not put into T. If array index variable v is divided by a value larger than 1 (div>1), $lb \leq v$ is put as is into T. If array index variable v is divided by a value smaller than 1 (div<1), this invention cannot handle it, so the array range check is not put into T. In case of any operation other than above (changed), this invention cannot handle it, so the array range check is not put into T.

(2) The Case of $v \leq ub$

If there is no operation for array index variable v (unchanged), $v \leq ub$ is put into T. In the case of an operation of incrementing array index variable v (increment), if added value c is a constant, $v+c \leq ub$ is put into T. On the other hand, in case of any operation of incrementing v other than this, $v \leq ub$ is put into T. In the case of an operation of decrementing array index variable v (decrement), if subtracted value c is a constant, $v-c \leq ub$ is put into T. In case of any operation of decrementing v other than this, the array range check is not put into T. If array index variable v is multiplied (multiply), the array range check is not put into T. If array index variable v is divided by a value larger than 1 (div>1), the array range check is not put into T. If array index variable v is divided by a smaller value than 1 (div<1), $v \leq ub$ is put into T. In case of any operation other than above (changed), the array range check is not put into T.

(3) The Case of $lb \leq f(v)$

If there is no operation for array index variable v (unchanged), $lb \leq f(v)$ is put into T. In the case of an operation of incrementing array index variable v (increment), if $f(v)$ is a monotonic function and added value c is a constant, then, $lb \leq f(v+c)$ is put into T. Even if not so, in the case that $f(v)$ decreases if v increases, then, $lb \leq f(v)$ is put into T. In the case of an operation of decrementing array index variable v (decrement), if $f(v)$ is a monotonic function and subtracted value c is a constant, then, $lb \leq f(v-c)$ is put into T. Even if not so, in the case that $f(v)$ decreases if v decreases, then, $lb \leq f(v)$ is put into T. If array index variable v is multiplied or if it is divided by a value smaller than 1 (multiply, div<1), in the case that $f(v)$ decreases if v increases, then, $lb \leq f(v)$ is put into T. If array index v is divided by a value larger than 1 (div>1), $lb<f(v)$ is put into T. In case of any operation other than the above (changed), the array range check is not put into T.

(4) The Case of $f(v) \leq ub$

If there is no operation for array index variable v (unchanged), $f(v) \leq ub$ is put into T. In the case of an operation of incrementing array index variable v (increment), if $f(v)$ is a monotonic function and added value c is a constant, then, $f(v+c) \leq ub$ is put into T. Even if not so, in the case that $f(v)$ increases if v increases, then, $f(v) \leq ub$ is put into T. In the case of an operation of decrementing array index variable v (decrement), if $f(v)$ is a monotonic function and subtracted value c is a constant, then, $f(v-c) \leq ub$ is put into T. Even if not so, in the case that $f(v)$ increases if v decreases, then, $f(v) \leq ub$ is put into T. If array index variable v is multiplied or if it is divided by a value smaller than 1 (multiply, div<1), in the case that $f(v)$ increases if v increases, then, $f(v) \leq ub$ is put into T. If array index v is divided by a value larger than 1 (div>1), $f(v) \leq ub$ is put into T. In case of any operation other than the above (changed), the array range check is not put into T.

Appendix B forward(FLAG_IN[B], B) is Obtained by the Following Pseudocode.

TABLE 24

```
forward(FLAG_IN[B], B) {
    T = 0;
    for each check C c C_IN[B] do
        case C of
            lb <= v:
                case AFFECT(B, v) of
                    unchanged: T = T ∪ { lb <= v }
                    increment: if added value c is a constant then
                                    T = T ∪ { lb <= v - c }
                                else
                                    T = T ∪ { lb <= v }
                    decrement: if subtracted value c is a constant then
                                    T = T ∪ { lb <= v + c }
                                /* otherwise not put into T */
                    multiply: T = T ∪ { lb <= v }
                    div > 1: /* not put into T */
                    div < 1: T = T ∪ { lb <= v }
                    changed: /* not put into T */
                end case
            v <= ub:
                case AFFECT(B, v) of
                    unchanged: T = T ∪ { v <= ub }
                    increment: if added value c is a constant then
                                    T = T ∪ { v - c <= ub }
                                /* otherwise not put into T */
                    decrement: if subtracted value c is a constant then
                                    T = T ∪ { v + c <= ub }
                                else
                                    T = T ∪ { v <= ub }
                    multiply: /* not put into T */
                    div > 1: T = T ∪ { v <= ub }
                    div < 1: /* not put into T */
                    changed: /* not put into T */
                end case
            lb <= f(v)
                case AFFECT(B, v) of
                    unchanged: T = T ∪ { lb <= f(v) }
                    increment: if f(v) is a monotonic function and
                                   added value c is a constant then
                                    T = T ∪ { lb <= f(v - c) }
                                else
                                   if v increases f(v) also increases then
                                    T = T ∪ { lb <= f(v) }
                    decrement: if f(v) is a monotonic function and
                                   subtracted value c is a constant then
                                    T = T ∪ { lb <= f(v + c) }
                                else
                                   if v decreases f(v) increases then
                                    T = T ∪ { lb <= f(v) }
                                /* otherwise not put into T */
                    multiply, div < 1:
                                   if v increases f(v) also increases then
                                    T = T ∪ { lb <= f(v) }
                    div > 1: if v decreases f(v) increases then
                                    T = T ∪ { lb <= f(v) }
                    changed: /* not put into T */
                end case
```

TABLE 24-continued

```
f(v) <= ub:
    case AFFECT(B, v) of
        unchanged: T = T ∪ { f(v) <= ub }
        increment: if f(v) is a monotonic function and
                      added value c is a constant then
                      T = T ∪ { f(v - c) <= ub }
                   else
                      if v increases f(v) decreases then
                         T = T ∪ { f(v) <= ub }
        decrement: if f(v) is a monotonic function and
                      subtracted value c is a constant then
                      T = T ∪ { f(v + c) <= ub }
                   else
                      if v decreases f(v) also decreases then
                         T = T ∪ { f(v) <= ub }
                      /* otherwise not put into T */
        multiply, div < 1:
                      if v increases f(v) decreases then
                         T = T ∪ { f(v) <= ub }
        div > 1: if v decreases f(v) also decreases then
                         T = T ∪ { f(v) <= ub }
        changed: /* not put into T */
        end case
    end case
}
return(T)
}
```

The final output of forward(FLAG_IN[B], B) is T. forward(FLAG_IN[B], B) is roughly divided into four portions depending on the form of array range checks included in FLAG_IN[B]. Namely, as to array index variable v, the cases of $lb \leq v$ (lower bound of an array), $v \leq ub$ (upper bound of an array), $lb \leq f(v)$ and $f(v) \leq ub$. Each case is further divided by operation for array index variable v (AFFECT(B, v)). Each case is described as follows.

(1) The Case of $lb \leq v$

If there is no operation for array index variable v (unchanged), $lb \leq v$ is put as is into T. In the case of an operation of incrementing array index variable v (increment), if added value c is a constant, $lb \leq v-c$ is put into T. If c is not a constant, $lb \leq v$ is put into T. In the case of an operation of decrementing array index variable v (decrement), if subtracted value c is a constant, $lb \leq v+c$ is put into T. If c is a not a constant, the array range check is not put into T. If array index variable v is multiplied (multiply), $lb \leq v$ is put into T. If array index variable v is divided by a value larger than 1 (div>1), the array range check is not put into T. If array index variable v is divided by a value smaller than 1 (div<1), $lb \leq v$ is put into T. In case of any operation for array index variable v other than above (changed), the array range check is not put into T.

(2) The Case of $v \leq ub$

If there is no operation for array index variable v (unchanged), $v \leq ub$ is put into T. In the case of an operation of incrementing array index variable v (increment), if added value c is a constant, $v-c \leq ub$ is put into T. If c is not a constant, the array range check is not put into T. In the case of an operation of decrementing array index variable v (decrement), if subtracted value c is a constant, $v+c \leq ub$ is put into T. If c is not a constant, $v \leq ub$ is put into T. If array index variable v is multiplied (multiply), the array range check is not put into T. If array index variable v is divided by a value larger than 1 (div>1), $v \leq ub$ is put into T. If array index variable v is divided by a smaller value than 1 (div<1), the array range check is not put into T. In case of any operation for array index variable v other than above (changed), the array range check is not put into T.

(3) The Case of $lb \leq f(v)$

If there is no operation for array index variable v (unchanged), $lb \leq f(v)$ is put as is into T. In the case of an operation of incrementing array index variable v (increment), if f(v) is a monotonic function and added value c is a constant, then, $lb \leq f(v-c)$ is put into T. If not so, in the case that f(v) also increases if v increases, then, $lb \leq f(v)$ is put into T. In the case of an operation of decrementing array index variable v (decrement), if f(v) is a monotonic function and subtracted value c is a constant, then, $lb \leq f(v+c)$ is put into T. If the above condition is not met and in the case that f(v) increases if v decreases, then, $lb \leq f(v)$ is put into T. Otherwise, the array range check is not put into T. If array index variable v is multiplied (multiply) and if it is divided by a value smaller than 1 (div<1), in the case that f(v) also increases if v increases, then, $lb \leq f(v)$ is put into T. If array index variable v is divided by a value larger than 1 (div>1), in the case that f(v) increases if v decreases, then, $lb \leq f(v)$ is put into T. In case of any operation for array index variable v other than the above (changed), the array range check is not put into T.

(4) The Case of $f(v) \leq ub$

If there is no operation for array index variable v (unchanged), $f(v) \leq ub$ is put as is into T. In the case of an operation of incrementing array index variable v (increment), if f(v) is a monotonic function and added value c is a constant, then, $f(v-c) \leq ub$ is put into T. If the above condition is not met and in the case that f(v) decreases if v increases, then, $f(v) \leq ub$ is put into T. In the case of an operation of decrementing array index variable v (decrement), if f(v) is a monotonic function and subtracted value c is a constant, then, $f(v+c) \leq ub$ is put into T. If the above condition is not met and in the case that f(v) also decreases if v decreases, then, $f(v) \leq ub$ is put into T. Otherwise, the array range check is not put into T. If array index variable v is multiplied (multiply) and if it is divided by a value smaller than 1 (div<1), in the case that f(v) decreases if v increases, then, $f(v) \leq ub$ is put into T. If array index variable v is divided by a value larger than 1, in the case that f(v) also decreases if v decreases, then, $f(v) \leq ub$ is put into T. In case of any operation other than the above (changed), the array range check is not put into T.

Appendix C

Figure 11:
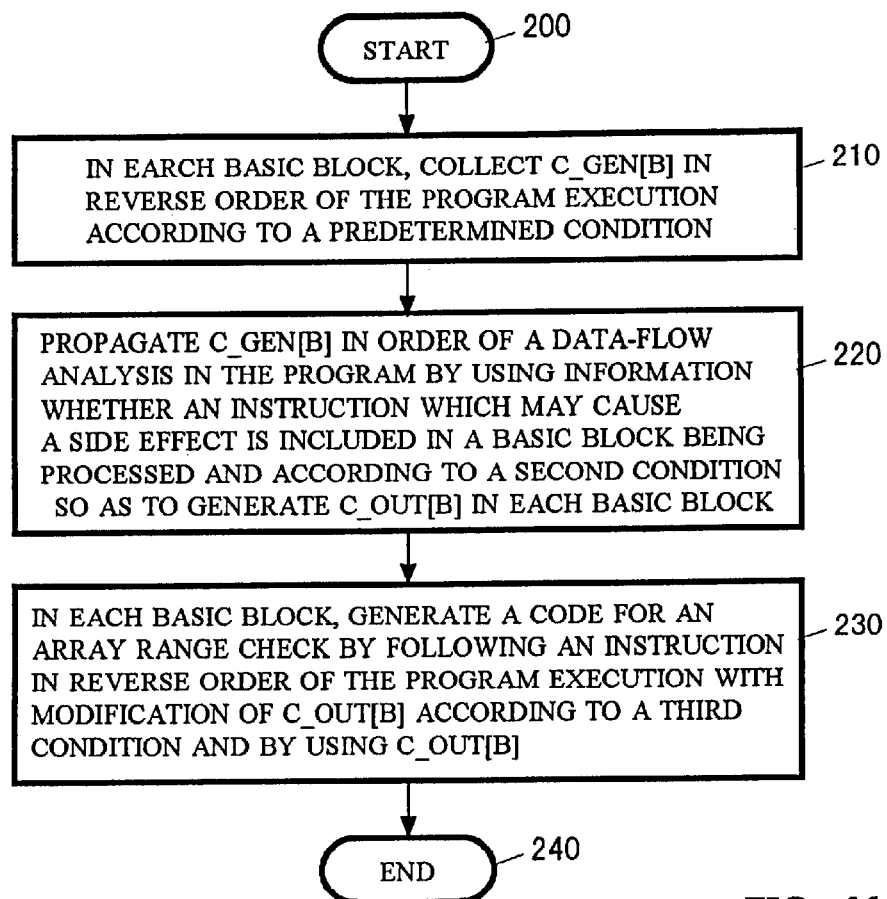
FIG. 11 is a flowchart representing a main processing of the portion for optimizing an array range check by performing data-flow analysis in reverse order of the program execution.

An optimization process for an array range check is described as follows. FIG. 11 shows an outline. First, in each basic block, C_GEN[B] is collected in reverse order of the program execution according to a predetermined condition (step 210). The collection result is stored in a storage. Then, C_GEN[B] is propagated in order of a data-flow analysis in the program by using information whether an instruction which may cause, a side effect is included in a basic block being processed and according to a second condition, and C_OUT[B] in each basic block is generated (step 220). C_OUT[B] is stored in a storage. The Backward process used above in relation to the second condition is performed. Lastly, in each basic block, a code for an array range check is generated by following each instruction in reverse order of the program execution with modification of C_OUT[B] according to a third condition and by using C_OUT [B] (step 230). The generated codes are stored in a storage. Each step is described in detail as follows.

In step 210, if there is an instruction which causes a side effect by moving an array range check issuing an exception before the side effect instruction, C_GEN[B] is made empty, and on the assumption that, if an array index variable is modified by means other than addition of a positive or negative constant, the array range check related to so modified array index variable is not handled, C_GEN[B], the array range check set information required in basic blocks is obtained in reverse order of the program execution. Incidentally, a side effect means that an execution result is different before and after moving, namely that the instruction is consequently no longer executed. Examples of this side effect instruction include an instruction which causes an exception, an instruction to write to a heap area, a function call, and in Java, an instruction which causes a side effect by moving a check such as an instruction to write a local variable in a try region. A pseudocode of step 210 is shown as follows.

TABLE 25

```
for (for each basic block, take out an instruction in
reverse order of the program execution) {
    switch (instruction) {
        array access:
            for array range check C
            C_GEN[B] += C;
            break;
        modification of array base variable a:
            for (all C c C_GEN[B]) {
                if (lb(a) or ub(a) on modified array base a is
                    included in C) {
                    C_GEN[B] -= C;
                }
            }
            break;
        modification of index v:
            for (all C ∈ C_GEN[B]) {
                if (C comprises modified index variable v
                        or expression f(v) of v) {
                    if (index v is modified by v = v + c
                        (c is a constant)) {
                        replace v of C with v + c, or f(v) with f(v + c)
                    } else }
                    C_GEN[B] -= C;
                }
            }
            break;
        an instruction causing a side effect by moving an
        array range check issuing an exception before it:
            C_GEN[B] = φ;
            break;
    }
}
```

In case of an instruction which causes a side effect by moving before it an array range check which causes an exception (hereafter, a side effect instruction), C_GEN[B] is made an empty φ. It is because the array range check cannot be moved.

In step 220, data-flow analysis through the following expression is performed by using this C_GEN[B] so as to generate C_OUT[B].

Figure 12:
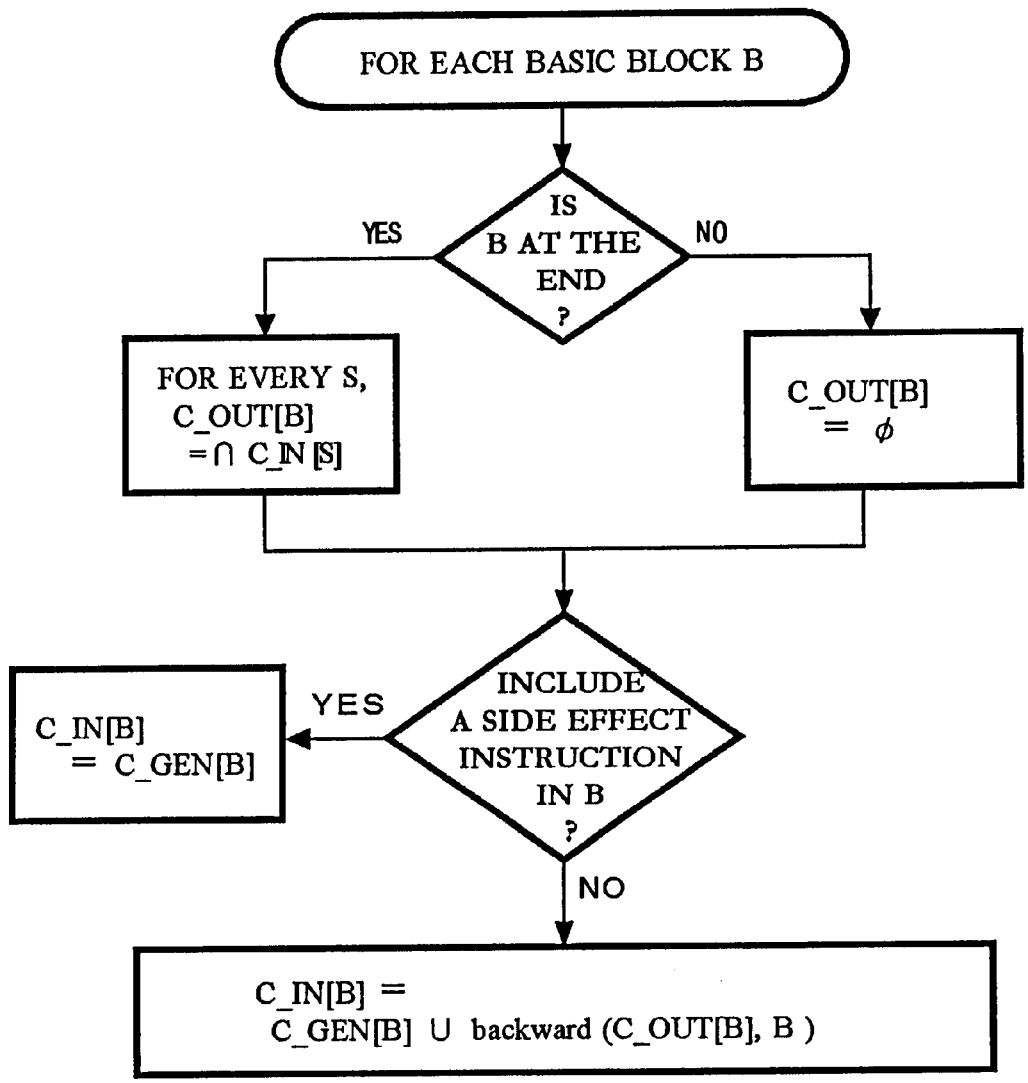
FIG. 12 is a flowchart representing a processing of step 220 in FIG. 11.

If B is not a basic block at the end, for S∈Succ(B),
C_OUT[B]=∩C_IN[S]
On the other hand, if B is a basic block at the end,
C_OUT[B]=φ
if (a side effect instruction is in B){
   C_IN[B]=C_GEN[B]
} else {
   C_IN[B]=C_GEN[B]∪backward(C_OUT[B], B)
} backward(C_OUT[B], B) is the same as one shown in Appendix A. Table 25 shows that, in obtaining C_OUT[B], it is necessary to calculate a product set of C_IN[S] if B is not at the end, and to make C_OUT[B] empty if B is at the end. As mentioned above, S is every basic block immediately after B. C_IN[B] is acquired by C_IN[B]=C_GEN[B] if there is an instruction in B which causes a side effect, and by C_IN[B]=C_GEN[B]∪backward(C_OUT[B], B) if there is no instruction in B which causes a side effect. The above is summarized in FIG. 12.

Step 230 is a process to generate a code for an array range check based on C_OUT[B]. The following shows a pseudocode.

TABLE 26

```
for (for each basic block, take out an instruction in
reverse order of the program execution) {
    switch (instruction) {
        array access:
            for the array range check C
            exist = FALSE;
            for (all C' ∈ C_OUT[B]) {
                if (C ⊆ C') {
                    exist = TRUE;
                    if (C ⊂ C') {
                        an array range check code is generated with C
                        as C'.
                        break;
                    }
                }
            }
            if (!exist) {
                C_OUT[B] += C;
                C's array range check code is generated.
                break;
            }
        modification of array base variable a:
            for (all C ∈ C_OUT[B]) {
                if (lb(a) or ub(a) on modified array base a is
                    included in C) {
                    C_OUT[B] -= C;
                }
            }
            break;
        modification of index v:
            for (all C ∈ C_OUT[B]) {
                if (C comprises modified index variable v
                        or expression f(v) of v) {
                    if (index v is modified by i = i + c
                        (c is a positive or negative constant)) {
                        replace v of C with v + c, or f(v) with f(v + c)
                    } else {
                        C_OUT[B] -= C;
                    }
                }
            }
            break;
        side effect instruction:
            C_OUT[B] = φ
            break;
    }
}
```

While Table 26 is similar to Table 25, the content of the process in the case that a taken instruction is an array access, which is the first switch condition, is different. First, after initializing exist to FALSE, array range check C for an array access being processed is checked for every C' in C_OUT[B]. Then, if C⊆C', exist is made TRUE and it is recorded that C is in overlapping relation with C_OUT[B]. Additionally if C⊂C' (in case that the range of array range check C is smaller than that of C' in C_OUT[B]), a code for an array range check is generated with C' instead of C since performing an array check on C' is more desirable here than an array check on C. On the other hand, since exist cannot be TRUE for any C' unless ⊆C', a code for an array range check is generated with this C. However, as a code for an array range check is generated for C here, C is added to C_OUT[B] so as not to perform an array range check of the same range thereafter.

Figure 13:
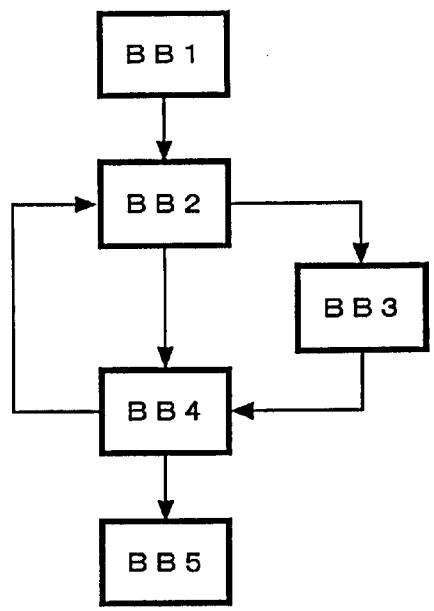
FIG. 13 is a flow graph of an example of Table 27.

An array range check is optimized as above. An example of performing an optimization process of the present invention to the example in Table 24 is shown below. FIG. 13 shows a flow graph of Table 27.

TABLE 27

```
/* here is BB1*/
i = 1;
t = 0;
do {
/* here is BB2*/
    i++;
    t += a[i] + a[i - 1] + a[i - 2];
    if (t < 0) {
        /* here is BB3*/
        i++;
        t += a[i] + a[i - 1] + a[i - 2] a[5];
    }
    /* here is BB4*/
    i++;
    t += a[i] + a[i - 1] + a[i - 2] + a[5];
{ while (i < n);
/* here is BB5*/
```

BB represents a basic block, and the number following it is that of the basic block.

Since BB1 has no array access, C_GEN[BB1] is empty. As step 210 is executed in reverse order of the program execution, $lb(a) \leq i-2$ and $i \leq ub(a)$ are first included in C_GEN[BB2]. The next instruction is i++, addition of an array index constant since i=i+1 is performed. Accordingly, 1 is added to i in $lb(a) \leq i-2$ and $i \leq ub(a)$. Namely, $lb(a) \leq (i+1)-2=i-1$ and $i+1 \leq ub(a)$ are input in C_GEN[BB2]. $lb(a) \leq i-2$, $i \leq ub(a)$, $lb(a) \leq 5$ and $5 \leq ub(a)$ are first included in C_GEN[BB3]. If C_GEN[BB3] is modified by the next instruction. i++ in reverse order of the program execution, it becomes $lb(a) \leq i-1$, $i+1 \leq ub(a)$, $lb(a) \leq 5$ and $5 \leq ub(a)$. Likewise, C_GEN[BB4] becomes $lb(a)<i-2$, $i+1 \leq ub(a)$. These are summarized as follows.

BB1: φ
BB2: $lb(a)<=i-1$, $i+1<=ub(a)$
BB3: $lb(a)<=i-1$, $i+1<=ub(a)$
  $lb(a)<=5$, $5<=ub(a)$
BB4: $lb(a)<=i-2$, $i+1<=ub(a)$
BB5: φ

As BB5 is the end basic block, C_OUT[BB5] is empty. C_GEN[BB5] is empty, so C_IN[BB5] is also empty. C_OUT[BB4] of BB4 is also empty due to the requirement of C_OUT[B]=3 C_IN[S]. However, since C_GEN[BB4] is $lb(a)<=i-2$, $i+1<=ub(a)$, C_IN[BB4] is also $lb(a)<=i-2$, $i+1<=ub(a)$. In the case that it is stored in a storage as (1) an array base, (2) a term of an array index which includes an index variable, (3) maximum constant offset of an array index, and (4) minimum constant offset of an array index, it will be (1) a (2) i (3) +1 (4) -2.

As C_OUT[BB3] is only acquired from C_IN[BB4], C_OUT[BB3] is also $lb(a)<=i-2$, $i+1<=ub(a)$. On the other hand, C_IN[BB3] is acquired from C_GEN[BB3] and backward(C_OUT[BB3], BB3). As BB3 includes addition of 1 (a constant), $lb(a)<=i-2$, $i+1<=ub(a)$ is corrected to T={$lb(a)<=i-1$, $i+2<=ub(a)$} (in the aforementioned storage method, (1) a (2) i (3) +2 (4) -1). Since C_GEN[BB3] is $lb(a)<=i-1$, $i+1<=ub(a)$, $lb(a)<=5$ and $5<=ub(a)$, C_IN [BB3] is lastly $lb(a)<=i-1$, $i+2<=ub(a)$, $lb(a)<=5$ and $5<=ub(a)$ (in the aforementioned storage method, (1) a (2) i (3) +2 (4) -1 and (1) a (2) null (3) 5 (4) 5).

C_OUT[BB2] is acquired from a product set of C_IN [BB4] and C_IN[BB3]. Since C_IN[BB4] is $lb(a)<=i-2$, $i+1<=ub(a)$, and C_IN[BB3] is $lb(a)<=i-1$, $i+2<=ub(a)$, $lb(a)<=5$ and $5<=ub(a)$, C_OUT[BB2] is $lb(a)<=i-1$, $i+1<=ub(a)$ (in the aforementioned storage method, (1) a (2) i (3) +1 (4) -1). On the other hand, C_IN[BB2] is a sum set of C_GEN[BB2] and backward(C_OUT[BB2], BB2). As backward(C_OUT[BB2], BB2) includes addition of 1 (a constant) in BB2, it becomes $lb(a)<=i$, $i+2<=ub(a)$ (in the aforementioned storage method, (1) a (2) i (3) +2 (4) 0). Since C_GEN[BB2] is $lb(a)<=i-1$, $i+1<=ub(a)$, C_IN [BB2] is lastly $lb(a)<=i-1$, $i+2<=ub(a)$ (in the aforementioned storage method, (1) a (2) i (3) +2 (4) -1). C_OUT [BB1] is acquired from C_IN[BB2]. Accordingly, C_OUT [BB1] is $lb(a)<=i-1$, $i+2<=ub(a)$ (in the aforementioned storage method, (1) a (2) i (3) +2 (4) -1). C_IN[BB1] is a sum set of C_GEN[BB1] and backward(C_OUT[BB1], BB1). However, since C_GEN[BB1] is empty and there is constant assignment of i (i=0) in BB1 in the backward process, every C in C_OUT[BB1] is eliminated and T will become empty. Accordingly, C_IN[BB1] becomes empty. The above processing results are summarized as follows.

C_IN[B]
BB1: φ
BB2: $lb(a)<=i-1$, $i+2<=ub(a)$
BB3: $lb(a)<=i-1$, $i+2<=ub(a)$
  $lb(a)<=5$, $5<=ub(a)$
BB4: $lb(a)<=i-2$, $i+1<=ub(a)$
BB5: φ
C_OUT[B]
BB1: $lb(a)<=i-1$, $i+2<=ub(a)$
BB2: $lb(a)<=i-1$, $i+1<=ub(a)$
BB3: $lb(a)<=i-2$, $i+1<=ub(a)$
BB4: φ
BB5: φ

The process of step 230 is performed next. First, BB1 is processed by using C_OUT[BB1]. However, since BB1 has no array access, a code for an array range check is not generated. Next, BB2 is processed by using C_OUT[BB2]. BB2 has an array access. Before application of the present invention, check($i<=ub(a)$) and check($i-2>=lb(a)$) were required. However, since $i+1<=ub(a)$ of C_OUT[BB2] covers a larger range than $i<=ub(a)$, check($i<=ub(a)$) is replaced by check($i+1<=ub(a)$). Also, in the case of processing BB3 by using C_OUT[BB3], before application of the present invention, check($i<=ub(a)$), check($lb(a)<=i-2$), check($lb(a)<=5$) and check($5<=ub(a)$) were required. However, since $i+1<=ub(a)$ in C_OUT[BB3] covers a larger range than check($i<=ub(a)$), this check($i<=ub(a)$) is replaced by check ($i+1<=ub(a)$) to generate a code. Although BB3 includes an operation of adding an array index variable as a constant, it has no effect since it is in reverse order of the program execution with no array access after the operation. BB4 is processed by using C_OUT[BB4] next, but it will be the same state as before application of the present invention since C_OUT[BB4] is empty. BB5 does not require processing. The following Table 28 shows the results of applying this process to Table 27. Meanwhile, Table 28 is presented so as to make the results of applying this invention understandable, and in reality an executable code is generated.

TABLE 28

```
i = 1;
t = 0;
    do {
        i++;
        check(lb(a) <= i - 2);
        check(i + 1 <= ub(a)); /*after replacing check(i <=
```

TABLE 28-continued

```
ub(a))*/
t += a[i] + a[i - 1] + a[i - 2];
if (t < 0) {
    i++;
    check(lb(a) <= i - 2);
    check(i + 1 <= ub(a)); /*after replacing check(i <=
    ub (a)) */
    check(lb(a) <= 5);
        /* a language whose lb(a) is 5 or less does not
           need this check */
    check(5 <= ub(a));
    t += a[i] + a[i - 1] + a[i - 2] + a[5];
}
i++;
check(lb(a) <= i - 3);
check(i <= ub(a));
t += a[i] + a[i - 1] + a[i - 2] + a[i - 3];
} while(i < n);
```

Appendix D

Elimination Process of Redundant Array Range Checks

FIG. 14 outlines this processing. First, in each basic block, C_GEN[B] which is a set of array range checks handled as already checked is collected in program execution order according to a predetermined condition (step 310). This C_GEN[B] is stored in a storage. Then, C_GEN[B] is propagated while being corrected according to a second condition in order of data-flow analysis of the program so as to generate C_IN[B], a set of array range checks handled as already checked at the beginning of each basic block (step 320). C_IN[B] is stored in a storage. Lastly, in each basic block, each instruction is traced in program execution order while correcting C_IN[B] according to a third condition so as to eliminate array range checks by using C_IN[B] (step 330).

Now, step is described. An instruction to modify an array base is not a subject of this invention here. On the other hand, in case an instruction to add a positive or negative constant to an array index variable is included, an array range check for the array index variable is handled as a subject of this invention. Under such conditions, C_GEN[B] which is a set of array range checks handled as already checked in a basic block is collected in program execution order. Meanwhile, in modifying an array index variable i to i+c (c is a positive or negative constant), array range check information is updated bay modifying array index expression f(i) of C_GEN[B] to f(i-c). The following shows a pseudocode of this process.

TABLE 29

```
for (for each basic block, take out an instruction in
program execution order) {
switch (instruction) {
    array access instruction:
        for the array range check C
        C_GEN[B] += C;
        expansion of C_GEN[B] += C;
        break;
    modification of array base variable a:
        for (all C ∈ C_GEN[B]) {
            if (lb(a) or ub(a) on modified array base a is
                included in C) {
                C_GEN[B] -= C;
            }
        }
```

TABLE 29-continued

```
        break;
    modification of index v:
        for (all C ∈ C_GEN[B]) {
            if (C comprises modified index variable v
                or expression f(v) of v) {
                if (index v is modified by i = i + c
                    (c is a positive or negative constant)) {
                        replace v in C with v - c, or f(v) with f(v - c).
                } else {
                    C_GEN[B] -= C;
                }
            }
        }
        break;
    }
}
```

An instruction in each basic block is scanned in program execution order in step 310. In the case of an array access instruction, array range check C of the array access is put into C_GEN[B]. If possible, expansion of C is also put into C_GEN[B]. This expansion is as follows.

(1) An array range check of a range calculated from a minimum constant offset value and a maximum constant offset value of the array index and a lower bound of the array.

Namely, a range of a constant index (lower bound of an array, lower bound of an array+(maximum constant offset value−minimum constant offset value) is regarded as already checked.

For instance, if a [i−1], a [i+1] are already checked on array ranges in Java language, a[0] to a[2] as to a constant index is also added to C_GEN[B] as already checked.

(2) An array range check of a range calculated from a lower bound of the array and lower and upper bound values of the array index variable.

If it meets either of the following conditions, and a value of an expression of an index calculated based on a lower or upper bound value has the lower bound value of the array or more, the range of the constant index of(value of an index expression calculated based on a lower bound of an array, lower and upper bound values of a variable) is regarded as already checked.

Conditions:

The index expression monotonously increases, and a lower bound value of an index variable is known.

The index expression monotonously decreased, and an upper bound value of an index variable is known.

For instance, if an array access is performed in the form of a [2*i+1] in Java language and it is found that the lower bound value of i is 5, a [0] to a [13] is added to C_GEN[B] as already checked at this check. Also, if an array access is in the form of a [10−i] and it is found that the upper bound value of i is 5, a[0] to a [5] is added to C_GEN[B] as already checked at this check.

A process in a case where base variable a of an array is modified is not different from that of the above Appendix C. A process in a case where array index variable v is modified is different from that of the above Appendix C. The array range check is represented by v or f(v), and it can be included in C_GEN[B] only in the case of addition or subtraction by a positive or negative constant. Accordingly, if it is not addition by a positive or negative constant, the elements of C-GEN[B] related to modified array index variable v are eliminated from C_GEN[B]. On the other hand, in case of addition by a positive or negative constant, subtraction by the constant, as opposed to the modification, is performed to the related array range checks in C_GEN[B]. Namely if the modification is v+c, v or f(v) of array range checks C is replaced by v-c or f(v-c).

Thus, an opposite modification must be performed because the instructions are traced in different directions. In the above-mentioned case of Appendix C, as it was in reverse order of the program execution, in the case, for instance, that a modification of i++ exists above (before) i≦ub(a) collected in C_GEN[B], the i of this i≦ub(a) becomes i+1 if seen from the beginning of the basic block.

On the other hand, since the instructions are traced in program execution order here, in the case, for instance, that a modification of i++ exists below (after) i≦ub(a) collected in C_GEN[B], the i of this i≦ub(a) becomes i-1 if seen from the end of the basic block. Thus, there are such differences in handling.

Next, step 320 is described. Here, data-flow analysis with the following expression is performed by using C_GEN[B] collected as above.

As to all P∈Pred(B), if B is not an initial block,
   C_IN[B]=∩C_OUT[P]
if B is an initial block,
   C_IN[B]=φ
   C_OUT[B]=C_GEN[B]∪forward(C_IN[B], B)

Pred(B) means basic block P which is immediately before B. forward(C_IN[B], B) is described in detail in the following. C_IN[B] in the above expression shows that it becomes a product set of C_OUT[P] of basic block P which is immediately before its basic block B. However, C_IN[B] is empty if B is a basic block at the beginning of the program. C_OUT[B] is acquired by using this C_IN[B].

Figure 15:
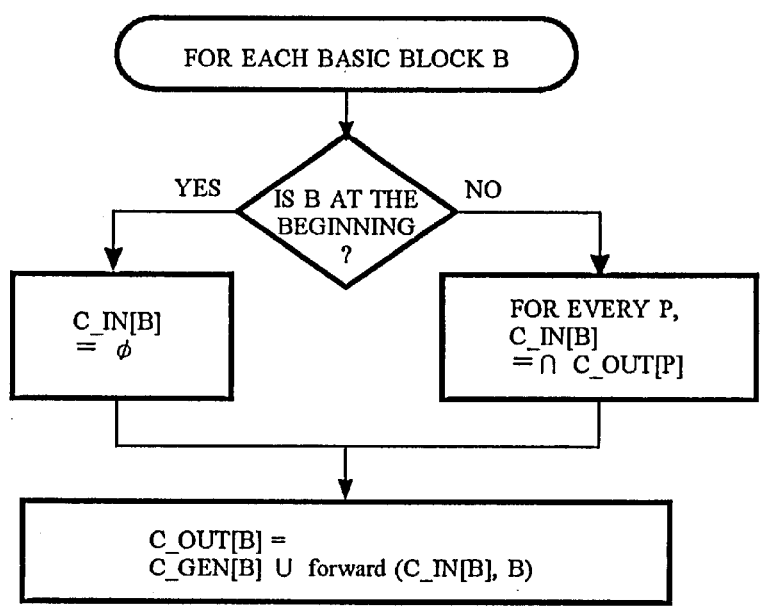
FIG. 15 is a flowchart representing a processing of step 320 in FIG. 14.

Namely, C_OUT[B]=C_GEN[B]∪forward(C_IN[B], B). This is summarized in FIG. 15.

The process in step 330 is performed with the following algorithm based on C_IN[B].

TABLE 30

```
for (for each basic block, take out an instruction in
program execution order) {
    switch (instruction) {
        array access instruction:
            for the array range check C
                if (C can determine from C_IN[B] as already
                    checked) {
                    array range check C is eliminated
                } else {
                    C_IN[B] += C;
                }
            break;
        modification of array base variable a:
            for (all C ∈ C_IN[B]) {
                if (ib(a) or ub(a) on modified array base a is
                    included in C) {
                    C_IN[B] -= C;
                }
            }
            break;
        modification of index v:
            for (all C ∈ C_IN[B]) {
                if (C comprises modified index variable v
                    or expression f(v) of v) {
                    if (index v is modified by i = i + c
                        (c is a positive or negative constant)) {
                        replace v with v - c, or f(v) with f(v - c).
                    } else {
                        C_IN[B] -= C;
                    }
                }
            }
            break;
    }
}
```

The difference between Table 30 and Table 29 is the process of a taken array access instruction. Here, if it can be determined that array range check C of the array access is already checked from C_IN[B], the array range check C is selected as a subject for elimination. Otherwise, the array range check remains since it is necessary. However, it remains, it is put into C_IN[B] since it can be used to eliminate following array range checks. Meanwhile, the cases in which it can be determined as already checked from C_IN[B] are not limited to those directly included in array range checks of C_IN[B]. The following cases may also be selected as a subject for elimination.

(1) When an array index is $(I_1+i_2+\ldots+I_n)/N$ and all index variables $I_1$ to $I_n$ have already been checked for an array base, and N is equal to n, this expression can also be handled as covered by the already checked part of an array range. In addition, only in the case of a language whose lower bound of an array is 0, it can also be handled as already checked if N has a value equal to or more than n.

(2) In Java language, when an array index is in the form of a residue such as A (any expression) mod N (N is a constant), if A always takes a positive value, the result will be within the range of 0 to abs(N)-1 (abs is an absolute value). If A always takes a positive value, and if the constant value of abs (N)-1 is already checked for the array base, this array access can also be handled as already checked. In the case of a programming language whose lower bound of an array index is not 0, it must also be checked whether constant 0 is already checked.

Here is an example of the above processing applied to Table 27. First, if step 310 is applied to Table 27, C_GEN[B] will be as follows. Namely, as BB1 has no array access, C_GEN[BB1] is empty.

Moreover, BB2 has two array range checks, and lb(a)≦i-2, i+1≦ub(a) is put as is into C_GEN[BB2] (when stored in a storage as (1) an array base, (2) a term of an array index which includes an index variable, (3) maximum constant offset of an array index, and (4) minimum constant offset of an array index, it will be (1) a (2) i (3) +1 (4) -2). In addition, i+1-(i-2)=3 as expansion of these, so lb(a)+3≦ub(a) can also be handled as already checked. Accordingly, this information is also put into C_GEN[BB2] (It is in the case of Java language. In the aforementioned storage method, (1) a (2) null (3) 3 (4) 0).

BB3 has four array range checks, and lb(a)≦i-2, i+1≦ub(a), lb(a)≦5, and 5≦ub(a) can be directly put as is into C_GEN[BB3] (in the aforementioned storage method, (1) a (2) i (3) +1 (4) -2 and (1) a (2) null (3) 5 (4) 5). While lb(a)+3≦ub(a) can be put into C_GEN[BB3] here, it is not performed here as in a language such as Java whose lb(a) is 0, it will be included in 5≦ub(a).

BB4 has two array range checks. lb(a)≦i-3 and i≦ub(a) are put as is into C_GEN[BB4] (in the aforementioned storage method, (1) a (2) i (3) 0 (4) -3). In addition, since lb(a)+3≦ub(a) is also derived from these, so it is put into C_GEN[BB4] (It is in the case of Java language. In the aforementioned storage method, (1) a (2) null (3) 3 (4) 0). Since BB5 has no array access, C_GEN[BB5] is empty. The results of C_GEN[B] are summarized as follows.

BB1: φ
BB2: lb(a)<=i-2, i+1<=ub(a)
   lb(a)+3<=ub(a)
BB3: lb(a)<=i-2, i+1<=ub(a)
   lb(a)<=5, 5<=ub(a)
BB4: lb(a)<=i-3, i<=ub(a)
   lb(a)+3<=ub(a)
BB5: φ

The results of step 320 are considered next. Since BB1 is an initial block, C_IN[BB1] is empty. Moreover, since C_GEN[BB1] is also empty in BB1, C_OUT[BB1] is also empty. Since C_OUT[BB1] is empty, C_IN[BB2] is also empty. As C_GEN[BB2] exists, C_GEN[BB2] as is, becomes C_OUT[BB2] Namely, $lb(a) \leq i-2$, $i+1 \leq ub(a)$, $lb(a)+3 \leq ub(a)$ (In the aforementioned storage method, (1) a (2) i (3) +1 (4) −2. In case of Java language, (1) a (2) null (3) 3 (4) 0). C_IN[BB3] will be the same as C_OUT[BB2]. C_OUT[BB3] is a sum set of C_GEN[BB3] and forward (C_IN[BB3], BB3). As to T=forward(C_IN[BB3], BB3), since BB3 includes i++, $lb(a) \leq i-2$, $i+1 \leq ub(a)$ and $lb(a)+3 \leq ub(a)$ of C_IN[BB3] are corrected to $lb(a) \leq i-3$, $i \leq ub(a)$ and $lb(a)+3 \leq ub(a)$ (In the aforementioned storage method, (1) a (2) i (3) 0 (4) −3. In case of Java language, (1) a (2) null (3) 3 (4) 0). Accordingly, the sum set of C_GEN[BB3] of $lb(a) \leq i-2$, $i+1 \leq ub(a)$, $lb(a) \leq 5$ and $5 \leq ub(a)$ is $lb(a) \leq i-3$, $i+1 \leq ub(a)$, $lb(a) \leq 5$ and $5 \leq ub(a)$, and $lb(a)+3 \leq ub(a)$ (In the aforementioned storage method, (1) a (2) i (3) +1 (4) −3 and (1) a (2) null (3) 5 (4) 5. In case of Java language, (1) a (2) null (3) 3 (4) 0).

C_IN[BB4] will be a product set of C_OUT[BB2] and C_OUT[BB3]. Accordingly, it is $lb(a) \leq i-2$, $i+1 \leq ub(a)$ and $lb(a)+3 \infty ub(a)$ (In the aforementioned storage method, (1) a (2) i (3) +1 (4) −2. In case of Java language, (1) a (2) null (3) 3 (4) 0). C_OUT[BB4] is a sum set of C_GEN[BB4] and forward(C_IN[BB4], BB4). As to forward(C_IN[BB4], BB4), since BB4 includes i++, it is $lb(a) \leq i-3$, $i \leq ub(a)$ and $lb(a)+3 \leq ub(a)$ (In the aforementioned storage method, (1) a (2) i (3) 0 (4) −3. In case of Java language, (1) a (2) null (3) 3 (4) 0) Accordingly, C_OUT[BB4], the sum set with C_GEN[BB4] which is $lb(a) \leq i-3$, $i \leq ub(a)$ and $lb(a)+3 \leq ub(a)$ becomes $lb(a) \leq i-3$, $i \leq ub(a)$ and $lb(a)+3 \leq ub(a)$ (In the aforementioned storage method, (1) a (2) i (3) 0 (4) −3. In case of Java language, (1) a (2) null (3) 3 (4) 0).

C_IN[BB5] is the same as C_OUT[BB4]. Moreover, C_OUT[BB5] is also the same as C_IN[BB5] since C_GEN[BB5] is empty and BB5 does not have operation of an array index. The results are summarized as follows.

C_IN[B]

BB1: φ

BB2: φ

BB3: $lb(a)<=i-2$, $i+1<=ub(a)$
 $lb(a)+3<=ub(a)$

BB4: $lb(a)<=i-2$, $i+1<=ub(a)$
 $lb(a)+3<=ub(a)$

BB5: $lb(a)<=i-3$, $i<=ub(a)$
 $lb(a)+3<=ub(a)$

C_OUT[B]

BB1: φ

BB2: $lb(a)<=i-2$, $i+1<=ub(a)$
 $lb(a)+3<=ub(a)$

BB3: $lb(a)<=i-3$, $i+1<=ub(a)$
 $lb(a)+3<=ub(a)$
 $lb(a)<=5$, $5<=ub(a)$

BB4: $lb(a)<=i-3$, $i<=ub(a)$
 $lb(a)+3<=ub(a)$

BB5: $lb(a)<=i-3$, $i<=ub(a)$
 $lb(a)+3<=ub(a)$

Meanwhile, in case of a language whose lb(a), namely a lower bound of array a is 0, the following results are acquired.

C_IN[B]

BB1: φ

BB2: φ

BB3: $lb(a)<=i-2$, $i+1<=ub(a)$
 $3<=ub(a)$

BB4: $lb(a)<=i-2$, $i+1<=ub(a)$
 $3<=ub(a)$

BB5: $lb(a)<=i-3$, $i<=ub(a)$
 $3<=ub(a)$

C_OUT[B]

BB1: φ

BB2: $lb(a)<=i-2$, $i+1<=ub(a)$
 $3<=ub(a)$

BB3: $lb(a)<=i-3$, $i+1<=ub(a)$
 $5<=ub(a)$

BB4: $lb(a)<=i-3$, $i<=ub(a)$
 $3<=ub(a)$

BB5: $lb(a)<=i-3$, $i<=ub(a)$
 $3<=ub(a)$

If the process of step 330 is performed, it will be as follows.

As BB1 has no array access, no process is performed. While there is i++ in BB2, no correction of content is made since C_IN[BB2] is empty, and two array range checks remain without being eliminated. Though two array range checks are added to C_IN[BB2] here, the process for BB2 ends since there is no longer any array access in BB2. Next, processing moves on to BB3. C_IN[BB3] is $lb(a) \leq i-2$, $i+1 \leq ub(a)$ and $lb(a)+3 \leq ub(a)$, and since i++ exists first, it is corrected. C_IN[BB3] becomes $lb(a) \leq i-3$, $i \leq ub(a)$ and $lb(a)+3 \leq ub(a)$ (In the aforementioned storage method, (1) a (2) i (3) 0 (4) −3. In case of Java language, (1) a (2) null (3) 3 (4) 0). Next, since there are four array range checks ($lb(a) \leq i-2$, $i+1 \leq ub(a)$, $lb \leq 5$, and $5 \leq ub(a)$), $lb(a) \leq i-2$ can be eliminated from C_IN[BB3]. The remaining array range checks are put into C_IN[BB3] with no processing thereafter.

Next, processing moves on to BB4. C_IN[BB4] is $lb(a) \leq i-3$, $i \leq ub(a)$ and $lb(a)+3 \leq ub(a)$. Since there is i++ in BB4 first, $lb(a) \leq i-2$, $i+1 \leq ub(a)$ and $lb(a)+3 \leq ub(a)$ is corrected to $lb(a) \leq i-3$, $i \leq ub(a)$ and $lb(a)+3 \leq ub(a)$ (In the aforementioned storage method, (1) a (2) i (3) 0 (4) −3. In case of Java language, (1) a (2) null (3) 3 (4) 0). Two array range checks existing in BB4 ($lb(a) \leq i-3$, $i \leq ub(a)$) are both covered by the corrected C_IN[BB4]. Accordingly, all array range checks are eliminated in BB4. Since there is no array range check in BB5, processing ends. The above results are shown in Table 31. While Table 31 shows a pseudocode, an executable code is generated in reality.

TABLE 31

```
i = 1;
t = 0;
do {
    i++;
    check(lb(a) <= i − 2);
    check(i + 1 <= ub(a));
    t += a[i] + a[i − 1] + a[i − 2];
    if (t < 0) {
        i++;
        check(i + 1 <= ub(a));
        check(lb(a) <= 5);
            /* a language whose lb(a) is 5 or less does not
               need this check */
        check(5 <= ub(a));
        t += a[i] + a[i − 1] + a[i − 2] + a[5];
    }
    i++;
    t += a[i] + a[i − 1] + a[i − 2] + a[i − 3];
} while ( i < n)
```

While the invention has been particularly shown and described with respect to preferred embodiments thereof, it will be understood by those skilled in the art that the foregoing and other changes in form and details may be made therein without departing form the spirit and scope of the invention.

Having this described our invention, what we claim as new, and desire to secure by Letters Patent is:

1. A method for generating a code for an array range check for an array access in a program, said method comprising: a first step of generating and storing in a memory storage a first code for storing in one or more storage areas a result of a combined array range check which combines a plurality of array range checks corresponding to a plurality of array accesses; and a second step of generating and storing in a memory storage a second code for checking said storage area and for invalidating a third code for an array range check included in the plurality of array range checks if said storage area indicates said combined array range check is successful.

2. The method according to claim 1, wherein said first step comprises a step of: combining array range checks for a plurality of array accesses according to a predetermined condition and storing in a memory storage information about the combined array range check; and allocating the result of the success or failure of said combined array range check to said storage area.

3. The method according to claim 1, in performing a versioning, further comprising the step of: generating and storing into a memory storage a code for referring to the storage area storing the result of the success or failure of said combined array range check which is a condition for the versioning, and for branching into a version not including a code for any array range check included in said combined array range check which is a condition for the versioning, and for branching into a version including said second and third codes if said storage area indicates failure of said combined array range check which is a condition for the versioning.

4. The method according to claim 1, wherein said storage area is a flag of a processor.

5. The method for generating a code for an array range check according to claim 1 wherein said first step comprising the steps of:

collecting first set information of array range checks for array accesses which are always performed even if passing through any execution path in a certain portion of said program, and storing in a storage a collection result;

collecting second set information of array range checks not restrictively for array range checks for array accesses which are always performed even if passing through any execution path in a certain portion, and storing in a storage a second collection result; and allocating array range checks included in said second set information to one storage area and allocating array range checks in third set information to one or a plurality of storage areas, said third information being said second information after removing array range checks included in said first set information.

6. A method for generating a code for an array range check for an array access in a program, said method comprising the steps of: generating and storing in a memory storage a second portion for performing an array range check for necessary range corresponding to the array access included, said second portion of the program to be processed corresponding to a first portion to be processed; performing for said first portion, an optimization process for array range checks and an elimination process for redundant array range checks regardless of the existence of a side effect instruction so that a side effect is caused by moving an array range check issuing an exception before said side effect instruction, and storing in a memory storage for each basic block in said first portion information about unremovable array range checks; and generating and storing in a memory storage a conditional branch code for performing said unremovable array range check and for jumping to a basic block in said second portion corresponding to a basic block which includes the unsuccessful and unremovable array range check.

7. A method for versioning a loop in a program, comprising the steps of: collecting first set information of array range checks for array accesses which are always performed even if passing through any execution path in said loop, and storing in a memory storage the collection result; by using said collection result, generating and storing in a memory storage a check code for the versioning; eliminating a redundant array range check by using said collection result, and generating and storing in a memory storage a version in a case that an array range check by said check code is successful, said version including a code for unremovable array range check; and generating and storing in a memory storage a version in a case that an array range check by said check code is unsuccessful.

8. The method for versioning according to claim 7, further comprising the steps of: collecting second set information of array range checks not restrictively for array range checks for array accesses which are always performed even if passing through any execution path in said loop, and storing in storage a second collection result; generating and storing in a storage a second check code for further versioning a version in the case that an array range check by said check code is successful by using third set information, said information being said second set information after removing array range checks included in said first set information; and eliminating a redundant array range check by using said second collection result, and generating and storing in a storage a version in the case that an array range check by said second check code is successful, said version including a code for unremovable array range check, wherein the version in the case that an array range check by said check code is successful is the version in the case that an array range check by said second check code is unsuccessful.

9. The method for versioning according to claim 7, further comprising the steps of: generating and storing in a storage a code for storing in a flag of a processor which executes the generated code a result of said first array range check, said check based on said unremovable array range check and a range of an index variable; and checking said flag, and if said flag indicates success of said first array range check, generating and storing in a storage another code for invalidating said code for unremovable array range check.

10. The method for versioning according to claim 7, further comprising the steps of: collecting second set information of array range checks not restrictively for array range checks for array accesses which are always performed even if passing through any execution path in said loop, and storing in a storage a second collection result; generating and storing in a storage a code for storing in a flag of a processor which executes the generated code a result of third set information, said information being said second set information after removing array range checks included in said first set information; and checking said flag, and if said flag indicates success of an array range check included in said third set information, generating and storing in a storage another code for invalidating said code for removable array range check.

11. An apparatus for generating a code for an array range check for an array access in a program, said apparatus comprising:

a memory storage;

storage area available to a processor;

first means for generating and storing in said memory storage a first code for storing in said storage area a result of combined array range check which combines a plurality of array accesses; and second means for generating and storing in said memory storage a third code for checking said storage area and for invalidating a second code for an array range check included in said plurality of array range checks if said storage area indicates said combined array range check is successful.

12. An apparatus for generating a code for an array range check or an array access in a program, said apparatus comprising:

a memory storage;

means for generating and storing in said memory storage a second portion for performing an array range check for necessary range corresponding to the array access included, said second portion of the program to be processed corresponding to a first portion to be processed;

means for performing for said first portion, an optimization process for array range checks and an elimination process for redundant array range checks regardless of the existence of side effect instruction so that a side effect is caused by moving an array range check issuing an exception before said side effect instruction, and for storing in said storage for each basic block in said first portion information about necessary array range checks; and means for generating and storing in said storage a conditional branch code for performing said necessary array range check and for jumping to a basic block in said second portion if said array range check is not successful, said basic block corresponding to a basic block which includes said unsuccessful array range check.

13. An apparatus for versioning a loop in a program, said apparatus comprising:

a memory storage;

means for collecting first set information of array range checks for array accesses which are always performed even if passing through any execution path in said loop, and for storing in said storage a collection result;

means for, by using said collection result, generating and storing in said storage a check code for the versioning;

means for eliminating a redundant array range check by using said collection result, and for generating and storing in said memory storage a version in the case that an array range check by said check code is successful, said version including a code for unremovable array range check; and means for generating and storing in said memory storage a version in the case that an array range check by said check code is unsuccessful.

14. A storage medium storing a program for generating a code for an array range check for an array access in a program to be processed, wherein said program has a processor execute:

a first step of generating and storing in a memory storage a first code for storing in a storage area a result of combined array range check which combines a plurality of array range checks corresponding to a plurality of array accesses; and a second step of generating and storing in a memory storage a third code for checking said storage area and for invalidating a second code for an array range check included in said plurality of array range checks if said storage area indicates said combined array range check is successful.

15. A storage medium storing a program for generating a code for an array range check for an array access in a program to be processed, wherein said program has a processor execute the steps of:

generating and storing in a memory storage a second portion for performing an array range check for necessary range corresponding to the array access included, said second portion of the program to be processed corresponding to a first portion to be processed; performing for said first portion, an optimization process for array range checks and an elimination process for redundant array range checks regardless of the existence of a side effect instruction so that a side effect is caused by moving an array range check issuing an exception before said side effect instruction, and storing in a storage for each basic block in said first portion information about removable array range checks; and generating and storing in a storage a conditional branch code for performing said unremovable array range check and for jumping to a basic block in said second portion if said array range check is not successful, said basic block corresponding to a basic block which includes said unsuccessful array range check.

16. A storage medium storing a program for versioning a loop in a program to be processed, wherein said program has a computer execute the steps of:

collecting first set information of array range checks for array accesses which are always performed even if passing through any execution path in said loop, and storing in a memory storage a collection result;

by using said collection result, generating and storing in a storage a check code for the versioning;

eliminating a redundant array range check by using said collection result, and generating and storing in a memory storage a version in the case that an array range check by said check code is successful, said version including a code for unremovable array range check; and generating and storing in a memory storage a version in the case that an array range check by said check code is unsuccessful.

17. A method for generating a code for an array range check, comprising the steps of:

combining a plurality of array range checks, and generating and storing in a memory storage a code for the combined array range check; and generating and storing in a memory storage a code for an array range check included in said plurality of array range checks for a case where a result of said combined array range is unsuccessful.

18. A method for versioning a certain portion in a program, comprising the steps of:

collecting first set information of array range checks for array accesses which are always performed even if passing through any execution path in said certain portion, and storing in a memory storage a collection result; by using said collection result, generating and storing in a storage a check code for the versioning;

eliminating a redundant array range check by using said collection result, and generating and storing in a memory storage a version in the case that an array range check by said check code is successful, and version including a code for unremovable array range check; and generating and storing in a memory storage a version in the case that an array range check by said check code is unsuccessful.

* * * * *